United States Patent
Tomchak et al.

(10) Patent No.: US 6,923,469 B2
(45) Date of Patent: Aug. 2, 2005

(54) COLLAPSIBLE WHEELBARROW

(75) Inventors: Michael J. Tomchak, Harrisburg, PA (US); Barry R. Albert, Dillsburg, PA (US); Mike Lupey, Waterfall, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 0 days.

(21) Appl. No.: 10/431,078

(22) Filed: May 7, 2003

(65) Prior Publication Data

US 2004/0036259 A1 Feb. 26, 2004

Related U.S. Application Data

(63) Continuation-in-part of application No. 10/216,071, filed on Aug. 9, 2002.

(51) Int. Cl.[7] .................................................. B62B 1/20
(52) U.S. Cl. ..................... 280/653; 280/652; 280/654; 280/764.1; 280/47.33
(58) Field of Search ............................... 280/653, 652, 280/47.31, 654, 47.2, 47.3, 47.315, 47.32, 47.33, 47.26, 47.27, 93.51, 763.1; D34/12–27

(56) References Cited

U.S. PATENT DOCUMENTS

| | | | | |
|---|---|---|---|---|
| 274,781 A | * | 3/1883 | Jacobs | 280/33.991 |
| 290,156 A | * | 12/1883 | Whitney | 280/47.31 |
| 872,926 A | * | 12/1907 | Gates | 280/47.31 |
| 2,727,751 A | * | 12/1955 | Souris | 280/645 |
| 3,235,281 A | * | 2/1966 | Faucette, Jr. | 280/47.31 |
| 3,315,930 A | | 4/1967 | Cota | |
| 3,552,760 A | * | 1/1971 | Sine | 280/653 |
| 3,722,904 A | * | 3/1973 | Puckett | 280/653 |
| 4,190,260 A | * | 2/1980 | Pearce | 280/47.31 |
| 4,223,860 A | | 9/1980 | Prest | |
| 5,121,970 A | * | 6/1992 | Andersen | 298/3 |
| 5,152,485 A | | 10/1992 | Follick | |
| 5,372,376 A | * | 12/1994 | Pharaoh | 280/653 |
| 5,788,260 A | | 8/1998 | Huang | |
| 5,908,202 A | | 6/1999 | Leger et al. | |
| 5,924,708 A | * | 7/1999 | Bisaillon et al. | 280/47.26 |
| 6,017,053 A | * | 1/2000 | Leger et al. | 280/653 |
| 6,186,523 B1 | | 2/2001 | Aielli | |
| 6,220,622 B1 | * | 4/2001 | Garcia | 280/653 |
| 6,328,331 B1 | | 12/2001 | McEnteggart | |
| D455,535 S | * | 4/2002 | Kamphuis | D34/27 |
| 6,390,496 B1 | * | 5/2002 | Eicher | 280/653 |
| 6,446,989 B1 | * | 9/2002 | Intengan | 280/47.34 |
| 6,508,478 B1 | * | 1/2003 | Ortez | 280/47.34 |
| 2002/0113389 A1 | * | 8/2002 | Robinson | 280/47.31 |

* cited by examiner

Primary Examiner—J. Allen Shriver
(74) Attorney, Agent, or Firm—David C. Jenkins; Brij K. Agarwal; Eckert Seamans Cherin & Mellot, LLC

(57) ABSTRACT

An improved wheelbarrow includes a pair of legs that are each configured as four-bar linkages and are collapsible. Each of the legs includes an advantageously simple lock for releasably locking the leg in extended and retracted positions. The wheelbarrow includes a frame assembly, a wheel, a tray, and a pair of handles. The frame assembly can be assembled by the manufacturer, and the wheelbarrow can then be provided as a kit in accordance with the present invention that can be assembled by the retailer or the consumer by simply attaching the wheel, the tray, and the handles to the frame assembly. A support block is disclosed which facilitates assembly and strengthens the legs.

22 Claims, 18 Drawing Sheets

COLLAPSIBLE WHEELBARROW

CROSS-REFERENCE TO RELATED APPLICATION

This application is a Continuation-In-Part of U.S. Pat. application Ser No. 10/216,071, filed Aug. 9, 2002, entitled "COLLAPSIBLE WHEELBARROW AND ASSOCIATED METHOD", the disclosures of which are incorporated herein by reference.

BACKGROUND OF THE INVENTION

1. Field of the Invention

The present invention relates generally to wheelbarrows and, more particularly, to a wheelbarrow having collapsible legs and also to a wheelbarrow that can be assembled relatively quickly.

2. Description of the Related Art

Wheelbarrows of numerous different configurations are known in the relevant art. Wheelbarrows can be generally stated as including a tray that can receive and carry a quantity of material therein, a wheel that supports the tray and permits the tray to be moved with respect to a surface such as the grade, and at least a first handle that permits a user to apply forces to drive the tray and the wheel to desired locations. Wheelbarrows typically also include one or more legs that can engage the surface on which the wheelbarrow is disposed to help support the tray and to retain the wheelbarrow in a given position on the surface.

A wheelbarrow with a wheel and one or more legs typically occupies a large region of space because the wheel and legs typically protrude downwardly from the tray at opposite ends of the tray. Such wheelbarrows thus require a large space for storage, and it is known that storage space within sheds, garages, and the like is limited. It is thus desired to provide a wheelbarrow that can be readily collapsed in some fashion, that is structurally sound, and that is substantially as functional as a conventional non-collapsible wheelbarrow.

While wheelbarrows are often configured out of relatively simple components, wheelbarrows typically take a substantial amount of time to assemble when new due to the large number of components. It is also preferred to provide an improved method of assembling a wheelbarrow that takes relatively less time than the assembly of previously known wheelbarrows.

SUMMARY OF THE INVENTION

An improved support and resulting wheelbarrow in accordance with the present invention meets these needs and other needs. The improved wheelbarrow includes a pair of legs that are each configured as four-bar linkages and are collapsible. Each of the legs includes an advantageously simple lock for releasably locking the leg in extended and retracted positions. The wheelbarrow includes a frame assembly, a wheel, a tray, and a pair of handles. The frame assembly can be assembled by the manufacturer, and the wheelbarrow can then be provided as a kit in accordance with the present invention that can be assembled by the retailer or the consumer by simply attaching the wheel, the tray, and the handles to the frame assembly. A support block is disclosed which facilitates assembly and strengthens the legs.

Accordingly, an aspect of the present invention is to provide an improved wheelbarrow that is at least partially collapsible.

Another aspect of the present invention is to provide an improved wheelbarrow that can be quickly assembled.

Another aspect of the present invention is to provide an improved wheelbarrow that occupies relatively less space during storage than other known wheelbarrows.

Another aspect of the present invention is to provide an improved wheelbarrow that has collapsible legs yet is able to carry and support heavy loads.

Another aspect of the present invention is to provide an improved wheelbarrow having collapsible legs that can be quickly and easily collapsed by a user.

Another aspect of the present invention is to provide an improved wheelbarrow having collapsible legs that can be locked in either the extended position or the retracted position.

Another aspect of the present invention is to provide an improved wheelbarrow having a lock that is simple in configuration and is inexpensive to provide.

Another aspect of the present invention is to provide an improved support block for use in a wheelbarrow, with the wheelbarrow having a frame that includes a number of pairs of ears protruding therefrom to which the legs of the wheelbarrow are attached, with one of the support blocks being disposed between each of the pairs of ears to resist deflection of the ears in order to strengthen the wheelbarrow.

Another aspect of the present invention is to provide an improved support block having a fastener hole formed therein, with the support being mounted on a frame of a wheelbarrow, and with the fastener hole being retained in a given position that allows it to accept and cooperate with a fastener that is employed to attach a tray to the frame.

These and other aspects of the present invention are achieved by providing an improved wheelbarrow that can be disposed on a surface, in which the general nature of the wheelbarrow can be stated as including a frame, at least a first wheel mounted on the frame, and a support. The support includes at least a first leg mounted on the frame, with the at least first leg being movable between an extended position and a retracted position. The at least first leg includes a first member, a second member, and a third member, with the first and third members each being pivotably mounted on the frame, and with the second member being pivotably connected with each of the first and third members. The wheelbarrow further includes a lock releasably retaining the at least first leg in at least one of the extended position and the retracted position. At least one of the first member, the second member, and the third member is pivotable about a pivot axis with respect to another of the first member, the second member, the third member, and the frame. The lock includes a dog and at least a first receptacle, with the dog being receivable in the at least first receptacle to releasably retain the at least first leg in the at least one of the extended and retracted positions. At least one of the dog and the at least first receptacle is deflectable in a direction generally parallel with the pivot axis.

Another aspect of the present invention is to provide a collapsible support for a device, the support being structured to retain the device in a given position with respect to a surface, in which the general nature of the support can be stated as including a first member, a second member, and a third member, with the second member being pivotably connected with the first and third members. The collapsible support further includes a lock extending between the second member and one of the first and third members. The second member and the one of the first and third members are pivotable with respect to one another about a pivot axis, with the support being movable between an extended position and a retracted position, and with the lock releasably retaining the support in at least one of the extended position and the retracted position. The lock includes a dog and at least a first receptacle, with the dog being receivable in the at least first receptacle to releasably retain the support in the at least one of the extended and retracted positions, and with at least one of the dog and the at least first receptacle being deflectable in a direction generally parallel with the pivot axis. The second member is engageable with the surface to retain the device in the given position with respect to the surface when the support is in the extended position, and the first and third members are each structured to be mounted on the device.

Another aspect of the present invention is to provide a substantially rigid body that is structured and arranged to resist deflection of a pair of structures of a wheelbarrow. The substantially rigid body has a mounting surface and a pair of support surfaces, and also includes a mounting hole formed therein. The mounting hole extends between the pair of support surfaces and is structured to cooperate with a fastener to permit the body to be mounted to the structures. The body includes a fastener hole formed therein, with the mounting hole and the fastener hole being offset from one another. The support block is structured and arranged to have one of the support surfaces disposed adjacent one of the structures and the other of the support surfaces disposed adjacent the other of the structures, whereby the support block is disposed between the pair of structures generally resists deflection of the structures.

Another aspect of the present invention is to provide a kit from which a wheelbarrow can be assembled, in which the general nature of the kit can be stated as including a frame subassembly having a frame, an axle apparatus, at least a first leg, and at least a first tray brace connected together as an assembled unit. The at least first tray brace is pivotable with respect to the frame. The kit further includes a wheel that is mountable to the frame subassembly, a tray that is mountable to the frame subassembly, at least a first handle that is mountable to the frame subassembly, a support block that is disposed on the frame, the support block including a fastener hole formed therein, and a fastener. The fastener is fastenably cooperable with the fastener hole of the support block to mount the tray to the frame subassembly.

BRIEF DESCRIPTION OF THE DRAWINGS

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENTS

Figure 1:
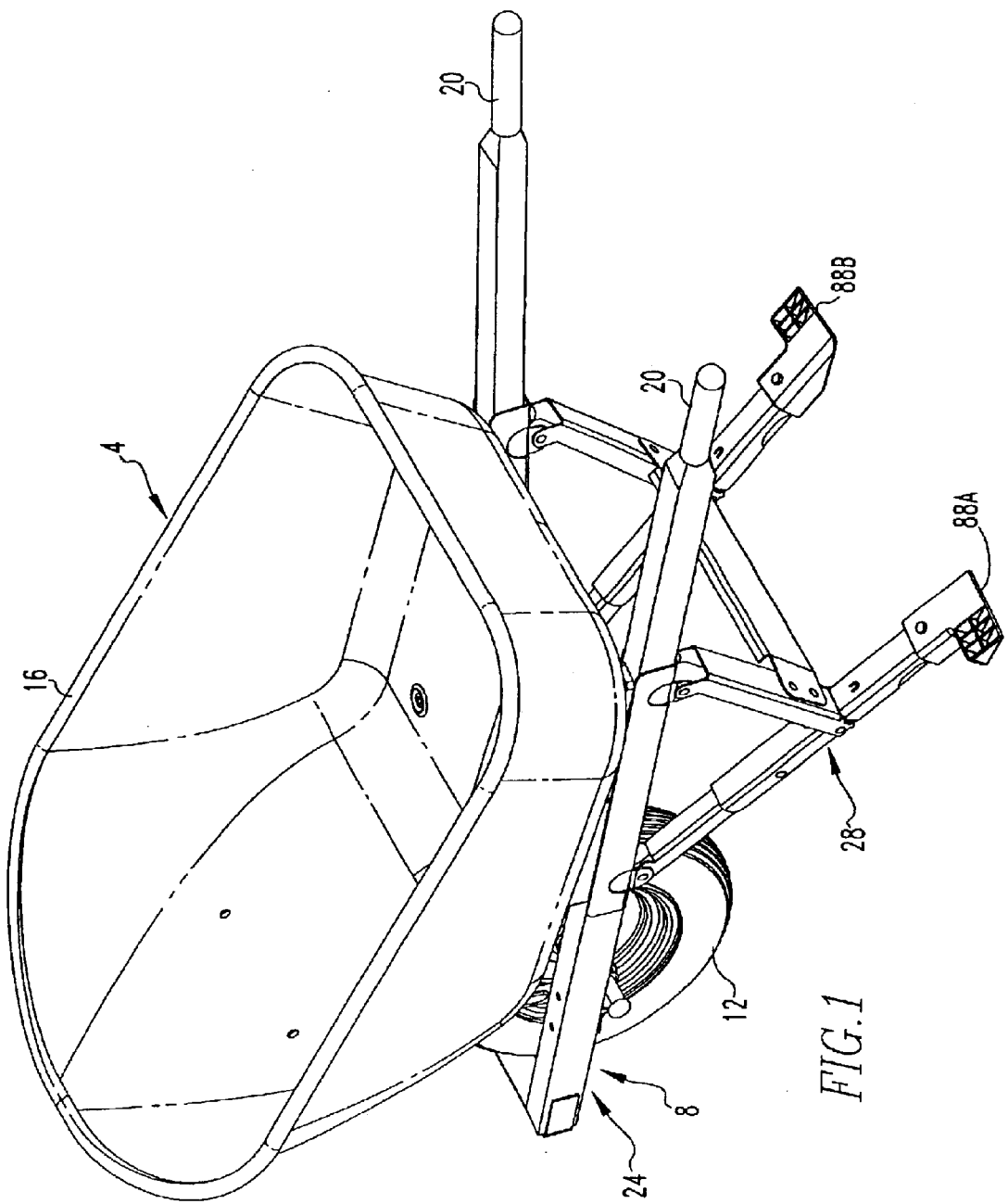
FIG. 1 is a side perspective view of an improved wheelbarrow in accordance with the present invention and depicting a pair of legs of the wheelbarrow being in an extended position.
Figure 2:
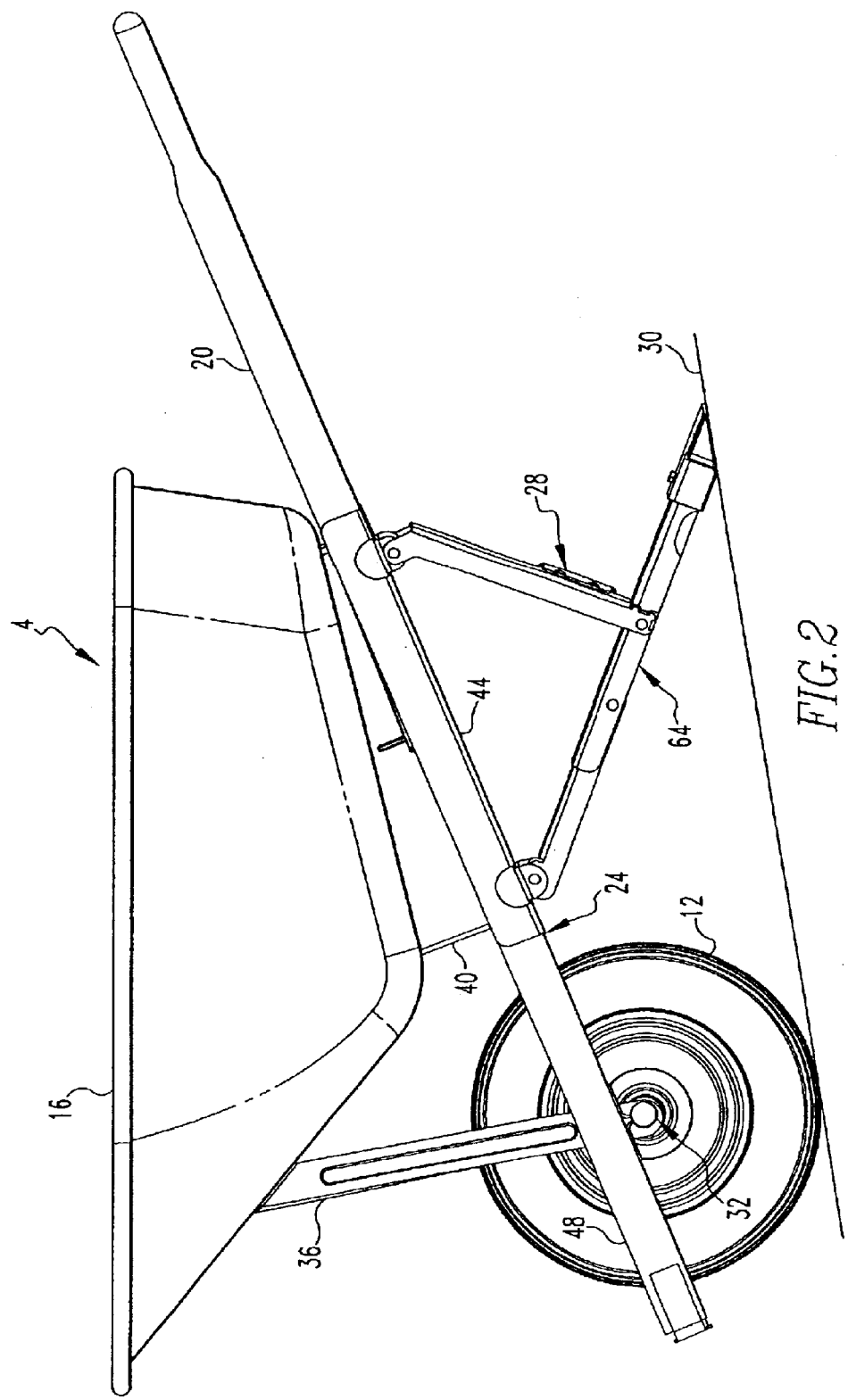
FIG. 2 is a side elevational view of the wheelbarrow disposed on a surface.
Figure 3:
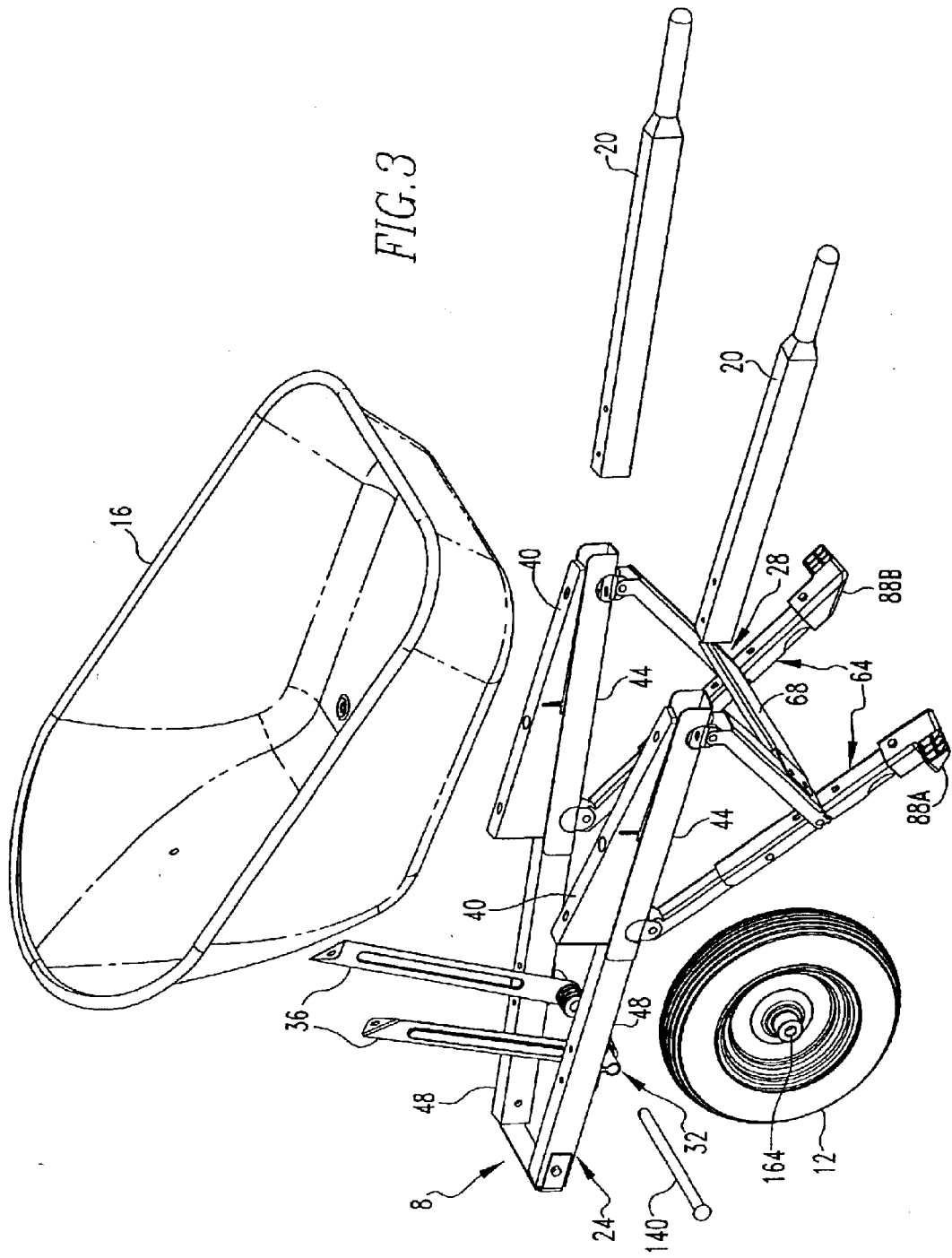
FIG. 3 is an exploded perspective view of the wheelbarrow with the legs in a retracted position.

An improved wheelbarrow 4 in accordance with the present invention is indicated generally in FIGS. 1–3. The wheelbarrow 4 is advantageously configured to be collapsible, as is indicated generally in FIG. 3A, in order to occupy less space than when the wheelbarrow 4 is in a non-collapsed position, as is indicated generally in FIG. 1. The wheelbarrow 4 also is advantageously configured to be quickly assembled during initial assembly of the wheelbarrow 4 when new.

As can be seen from FIG. 3, the wheelbarrow 4 includes a frame subassembly 8, a wheel 12, a tray 16, and a pair of handles 20. The wheel 12, the tray 16, and the handles 20 are mountable to the frame subassembly 8 in order to form the assembled wheelbarrow 4. The frame assembly 8 can be advantageously manufactured and delivered to a retailer or a customer in an assembled condition as is depicted generally in FIG. 3. In order to construct the wheelbarrow 4, the wheel 12, the tray 16, and the handles 20 are mounted to the frame subassembly 8. The frame subassembly 8, the wheel 12, the tray 16, and the handles 20 can be sold together as a kit including appropriate fasteners (not shown) which can be easily and quickly assembled by the retailer or the customer since the frame subassembly 8 is delivered in an assembled condition.

Figure 3A:
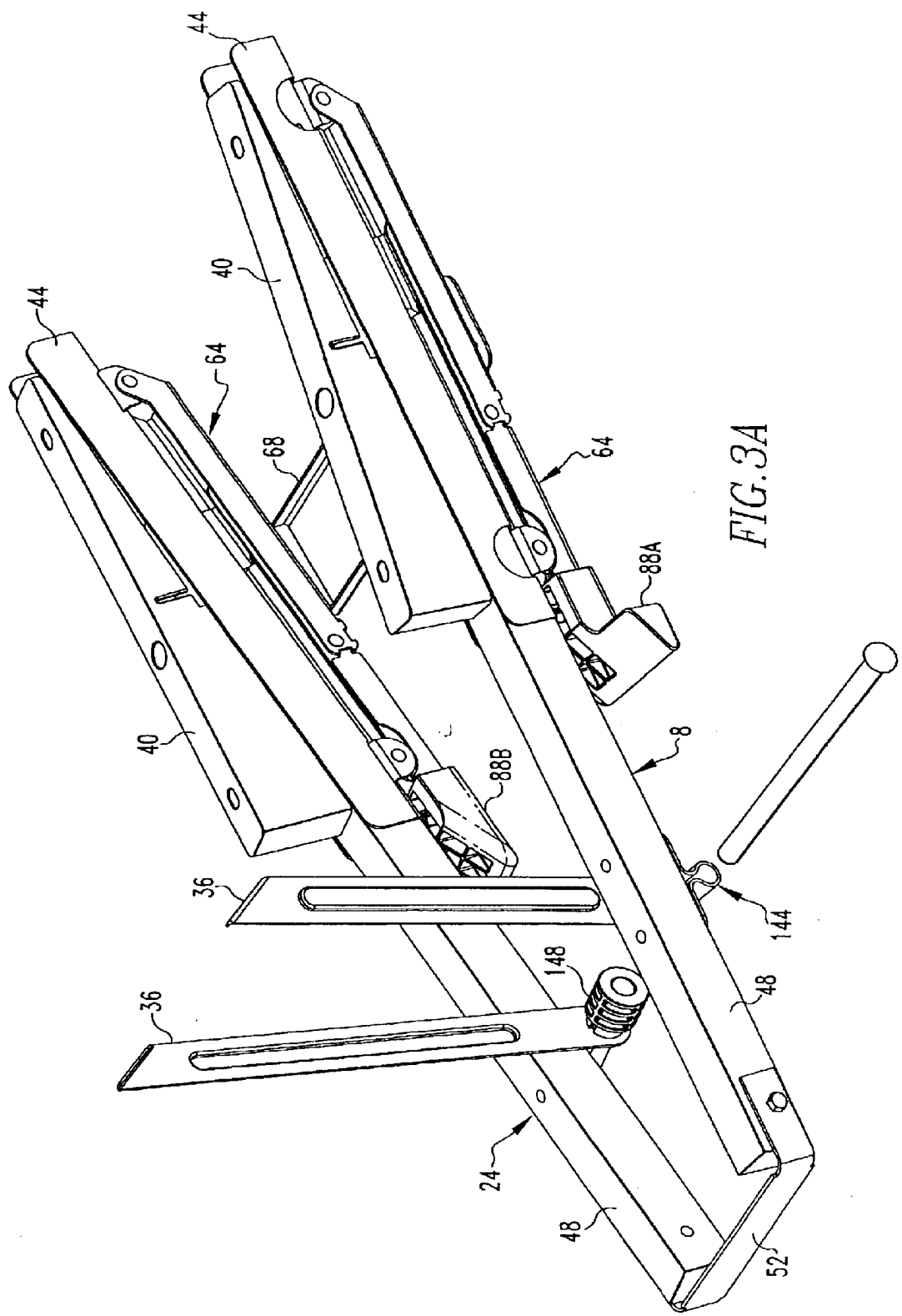
FIG. 3A is a perspective view of a portion of the wheelbarrow and depicting the pair of legs in the retracted position.

The frame subassembly 8 includes a frame 24, a support 28, an axle apparatus 32, a pair of tray braces 36, and pair of risers 40. The frame 24 serves as a central structure to which many of the components of the wheelbarrow 4 are attached. The support 28 is movable between an extended position, as is shown in FIG. 1, and a retracted position, as is shown in FIG. 3A. The support 28 is configured to retain the wheelbarrow 4 in a given position or orientation with respect to a surface 30 (FIG. 2) upon which the wheelbarrow 4 is disposed. As used herein, the expression "surface" refers to a face of any type of structure, whether natural or artificial, and is not limited to planar or horizontal faces, and thus can include, for instance, a surface of the earth, a surface of a man-made structure such as a floor, and any other type of face of a structure.

The axle apparatus 32 is disposed on the frame 24 and is configured to receive the wheel 12 thereon in order to mount the wheel 12 to the frame 24. The tray braces 36 are pivotably mounted on the axle apparatus 32 and are configured to extend from the axle apparatus 32 to the tray 16 in order to securely mount the tray 16 to the frame subassembly 8. The risers 40 are mounted on the frame 24 and are configured to orient the tray 16 at specific angles with respect to the support 28 and/or the horizontal when the support 28 is engaged with the surface 30 and when the handles 20 are being carried by a user of the wheelbarrow 4, all in a known fashion.

Figure 4:
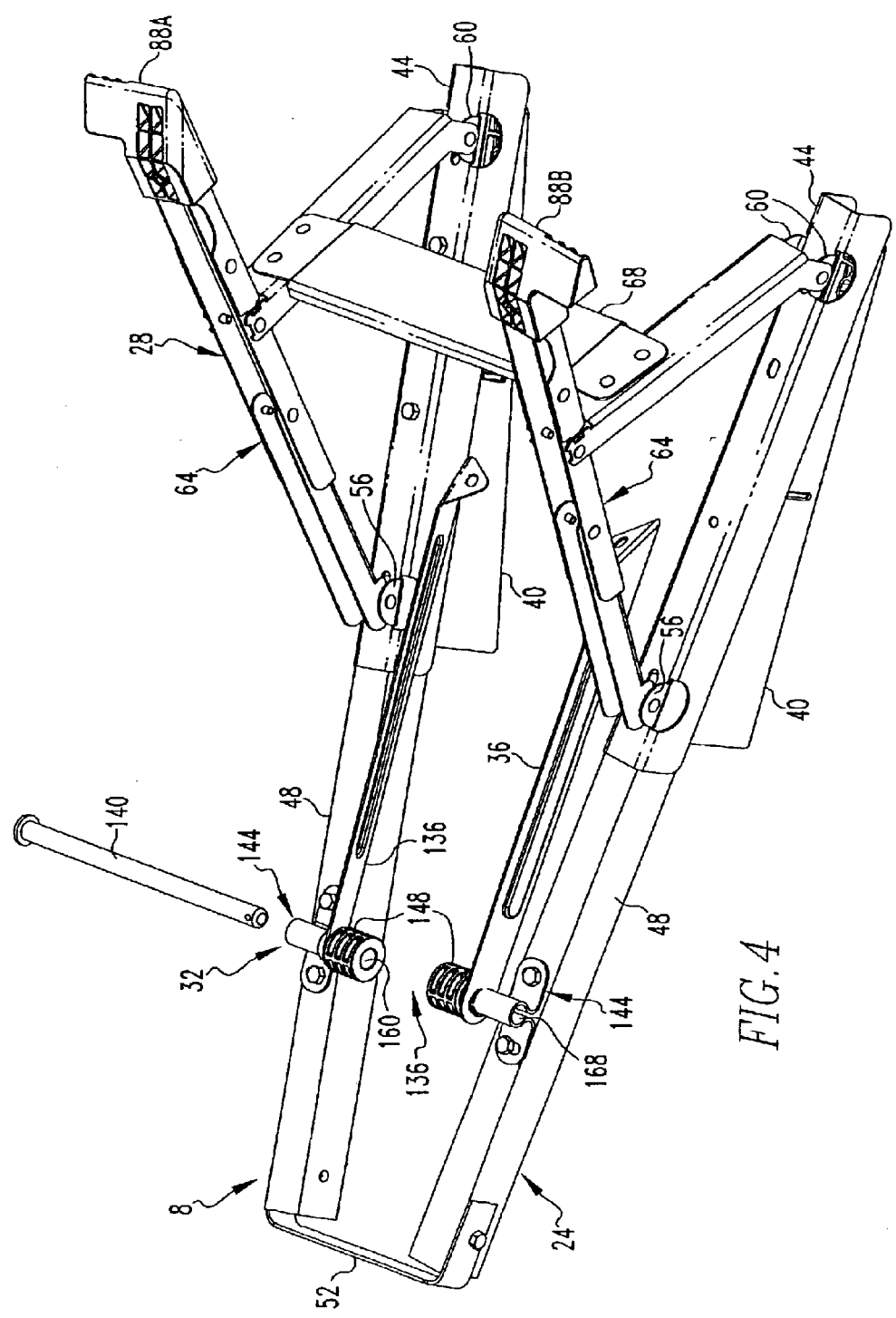
FIG. 4 is a bottom perspective view of a portion of the wheelbarrow.

As is best shown in FIG. 4, the frame 24 includes a pair of central frame members 44, a pair of frontal frame members 48, and a kicker 52 extending between the frontal frame members 48. The central frame members 44 can be U-shaped channels of metal, such as steel, although other materials and configurations are possible without departing from the concept of the present invention. The frontal frame members 48 are substantially rigid and may be manufactured out of wood or other sufficiently rigid structure to which the axle apparatus 32 can be attached. Alternatively, the central and frontal frame members 44 and 48 and the handles 20 may be of tubular materials. The frontal frame members 48 are at least partially received within the central frame members 44, whereby the frontal frame members 48 are connected with the central frame members 44, although other attachment methodologies may be employed. The kicker 52 contributes to the rigidity of the frame 24 and serves as a foot upon which the wheelbarrow 4 can be supported and pivoted when the contents of the tray 16 are being dumped out of the tray 16.

Each central frame member 44 includes a pair of forward ears 56 and a pair of rearward ears 60, with the forward and rearward ears 56 and 60 protruding in a generally downward direction (from the perspective of FIG. 2). The forward and rearward ears 56 and 60 may be formed out of a portion of the webs of the central frame members 44, or could be formed as separate structures such as brackets that are attached to the central frame members 44. Such a configuration might be particularly appropriate if the central and frontal frame members 44 and 48 and the handles 20 were replaced with a pair of elongated members that form both the handles and part of the frame. The support 28 is mounted on the forward and rearward ears 56 and 60.

The support 28 includes a pair of legs 64 and a cross brace 68. The legs 64 are each substantially identical to one another. The legs 64 are movable between an extended position (FIG. 1) and a retracted position (FIG. 3A) and are engageable with the surface 30 (FIG. 2) to retain the wheelbarrow 4 in a given orientation or position with respect to the surface 30.

The cross brace 68 extends between the legs 64 and causes the legs 64 to move simultaneously when the legs 64 are moving between the extended and retracted positions. One of the legs 64 is mounted on one of the central frame members 44, and the other of the legs 64 is mounted on the other of the central frame members 44, although the legs 64 could be mounted to the frame 24 in other fashions. The cross brace 68 contributes to the rigidity of the frame 24 by resisting relative motion between the legs 64.

Figure 5:
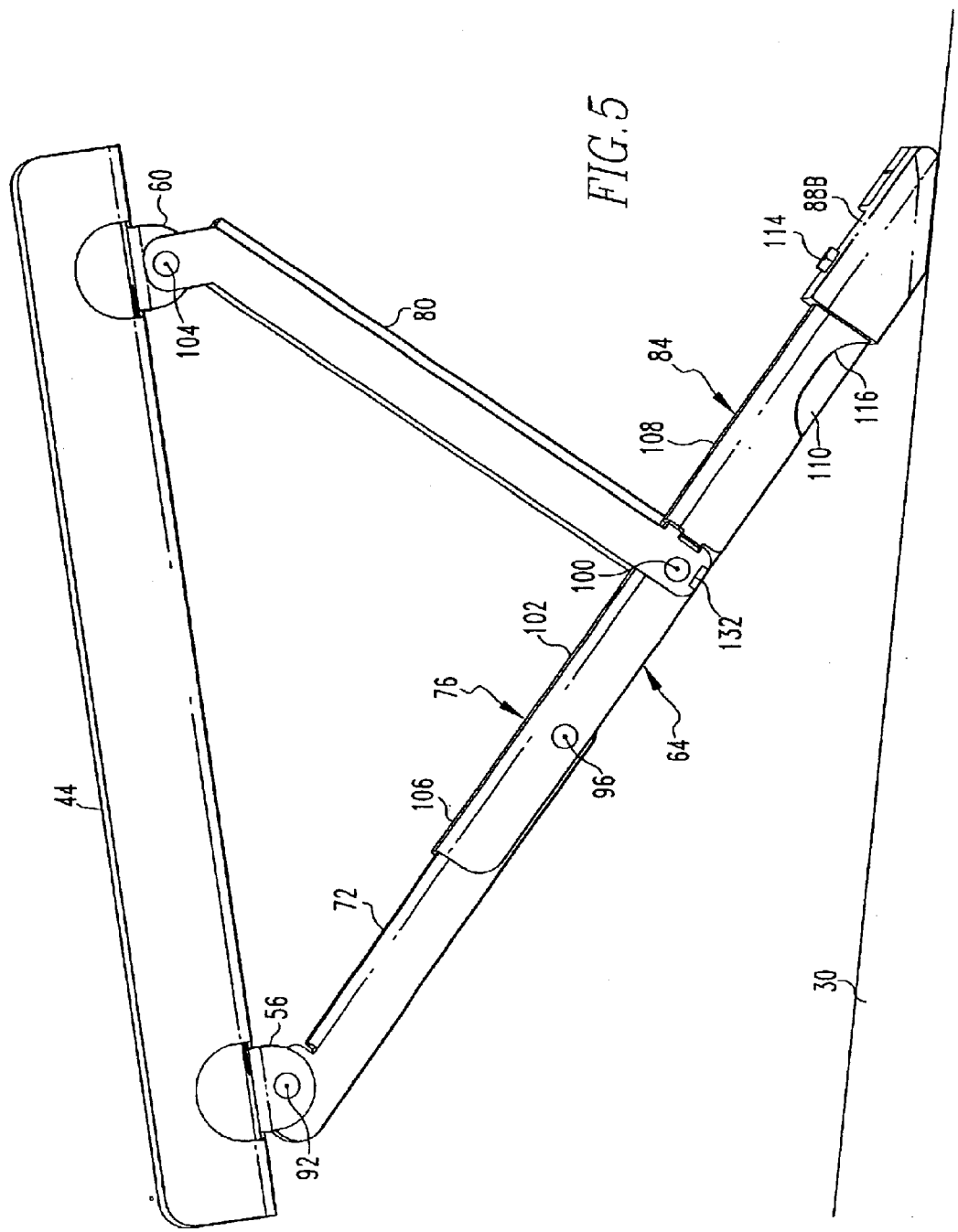
FIG. 5 is an enlarged view of one of the legs of the wheelbarrow depicted in the extended position.

As is best shown in FIG. 5, each leg 64 includes a first member 72, a second member 76, a third member 80, a lock 84, and a shoe 88A or 88B. The first, second, and third member 72, 76, and 80 are, in the depicted embodiment, each generally U-shaped in cross section whereby each includes an interior channel defined generally between the three webs of the U-shaped section. Since the legs 64 are substantially identical, the specific details thereof will be described with respect to only one of the legs 64, it being understood that the same details are equally applicable to the other of the legs 64.

The first member 72 is pivotably mounted on the forward ears 56 at a first pivot point 92. The first member 72 and a second member 76 are pivotably connected with one another at a second pivot point 96 which is at an opposite end of the first member 72 from the first pivot point 92. The second member 76 is pivotably connected with the third member 80 at a third pivot point 100. The third member 80 is pivotably connected with the rearward ears 60 at a fourth pivot point 104.

The shoe 88A or 88B is fixedly mounted on an end of the second member 76 with a fastener 114, such as a bolt or other appropriate fastener. The shoes 88A and 88B of the two legs 64 are substantially mirror images of one another and constitute substantially the only difference between the two legs 64.

Figure 6:
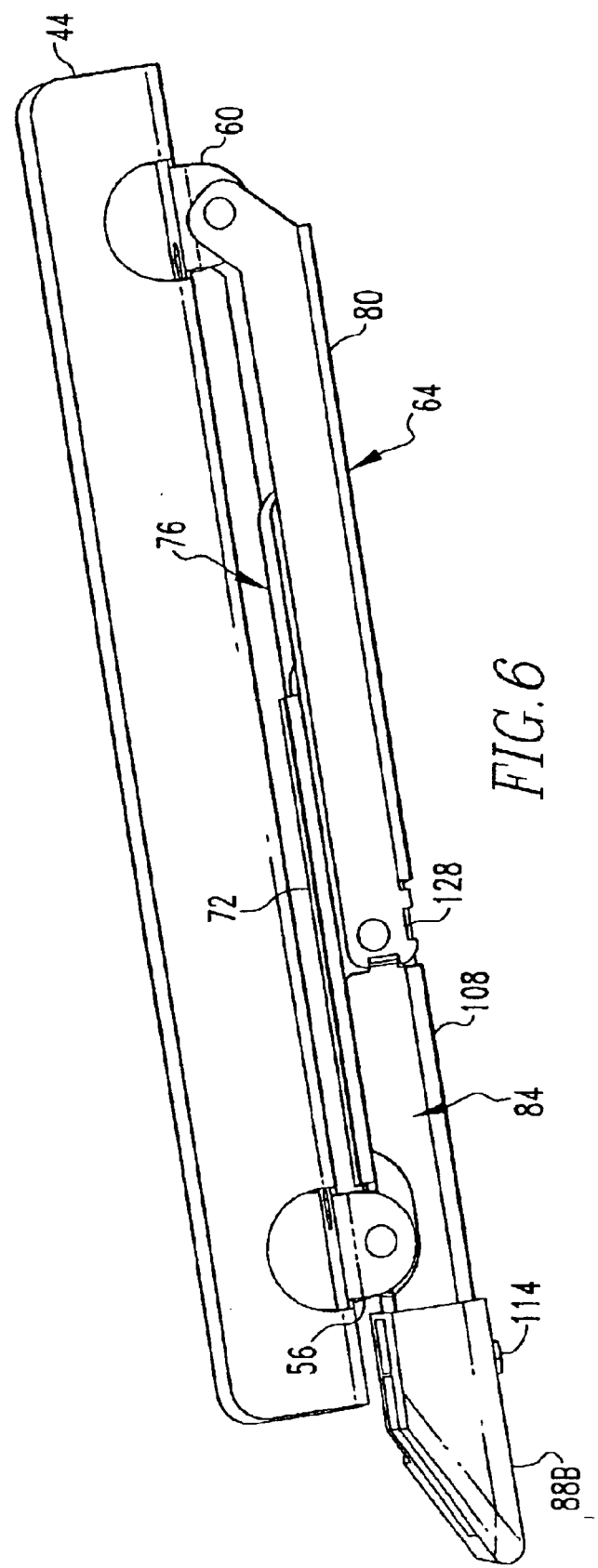
FIG. 6 a view similar to FIG. 5, except depicting the leg in the retracted position.
Figure 7:
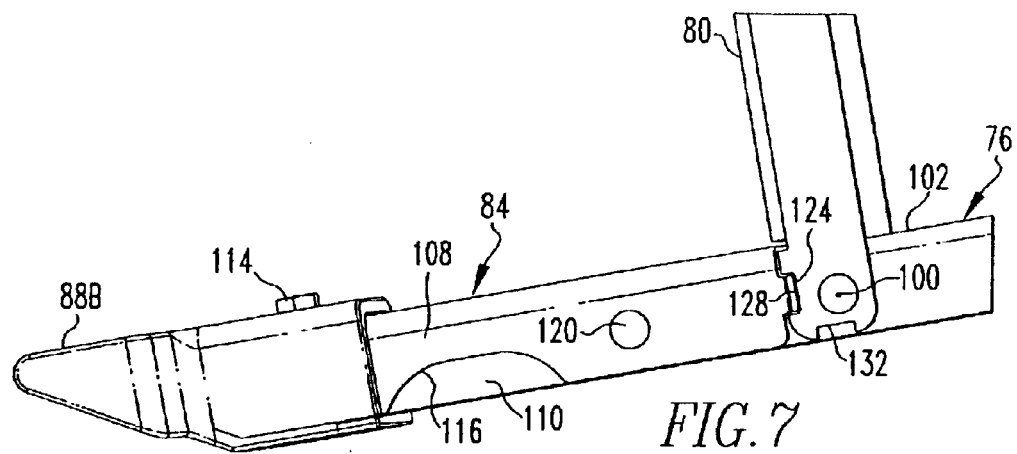
FIG. 7 is an enlarged view of a portion of the leg.

The lock 84 is slidably disposed on the second member 76 and is formed with a pair of undercuts 116 (FIG. 5) that can accommodate the forward ears 56 therein when the leg 64 is in the retracted position, as can be seen in FIG. 6. A portion of the second member 76 can be observed in FIG. 5 behind the undercut 116 thereof.

As can be seen from FIG. 5, the second member 76 can be stated as including a central portion 102 extending generally between the second and third pivot points 96 and 100, a first protruding portion extending from the second pivot 96 away from the central portion 102, and a second protruding portion 110 extending between the third pivot point 100 and the shoe 88A or 88B. The lock 84 is slidably disposed on the second protruding portion 110. When the leg 64 is in the extended position, the first protruding portion 106 overlaps and engages the first member 72. When the shoe 88A or 88B is disposed against the surface 30, the first protruding portion 106 resists buckling of the leg 64 due to a heavy load carried in the tray 16. The first protruding portion 106 thus serves as a buttress against the first member 72 in order to enhance the strength of the leg 64 when in the extended position to resist failure of the leg 64 due to a load carried in the tray 16.

The central frame member 44 and the first, second, and third members 72, 76, and 80 together work as a four-bar linkage for movement between the extended and retracted positions. As used herein, the expression "four-bar linkage" shall refer generally to any type of linkage that operates substantially within a plane and that includes four links that are pivotably connected end-to-end in a closed loop. In this regard, therefore, various "links" may be defined generally between pivot points.

Accordingly, the first, second, and third members 72, 76, and 80 pivot with respect to one another and with respect to the central frame member 44 when moving between the extended and retracted positions. The first, second, third, and fourth pivot points 92, 96, 100, and 104 accordingly can be configured with heavy connection structures such as rivets, bolts and nuts, pins, and the like to enhance the strength of the leg 64.

In moving the leg 64 from the extended to the retracted positions, it can be understood that the first member 72 pivots in a counter-clockwise direction from the perspective of FIG. 5 and that the second and third members 76 and 80 pivot in a clockwise direction with respect to FIG. 5. The tray 16 need not be detached from the structures to which it is mounted.

When the leg 64 is in the retracted position, a portion of the first member 72 is received in the interior channel of the second member 76, and a portion of the second member 76 is received in the interior channel of the third member 80. It is thus understood that the first member 72 is relatively narrower than the second member 76 which is, in turn, relatively narrower than the third member 80. In this regard, it can be seen that the first member 72 is disposed between the forward ears 56 while the third member 80 is mounted to the faces of the rearward ears 60 that face away from one another. Such variation in the widths of the first, second, and third members 72, 76, and 80 facilitates the collapsing of the leg 64 into itself when the leg 64 is in the retracted position.

In the retracted position, the third member 80 is the structure that protrudes substantially the greatest distance from the central frame member 44, and such protruding distance is extremely small compared with the size of the leg 64 in the extended position. This is due, at least in part, to the ability of the first, second, and third members 72, 76, and 80 to be collapsed substantially within one another in the retracted position. It can be additionally be seen that the leg 64 in the retracted position is disposed substantially flush with the central frame member 44 and is oriented substantially parallel with the central frame member 44. It is understood that the space in FIG. 6 between the leg 64 and the central frame member 44 is greatly exaggerated for purposes of clarity.

The lock 84 advantageously permits the leg 64 to be lockably and releasably retained in the extended and retracted positions. The lock 84 extends operatively between the second and third members 76 and 80, although it is understood that the lock 84 alternatively could extend operatively between the first and second members 72 and 76 or between the central frame member 44 and either of the first and third members 72 and 80.

The lock 84 includes a shank 108, a pin 120 (FIGS. 8, 8A, and 9), a pair of first notches 128 and a pair of second notches 130 formed on the third member 80, and a biasing device 134. The shank 108 is slidable on the second protruding portion 110 between an engaged position (FIG. 8) and a disengaged position (FIG. 9). The pin 120 is disposed on the shank 108 and is received in a slot 112 formed in the second member 76. The sliding of the pin 120 in the slot 112 therefore defines the movement of the shank 108 between the engaged and disengaged positions.

The shank 108 includes a pair of tabs 124 at one end of the shank 108, with the opposite end of the shank 108 being received in a channel (not shown) formed in the shoe 88A or 88B. The end of the shank 108 is received in the channel of the shoe 88A or 88B when the shank is in the engaged position, with the end of the shank 108 being even further received into the channel of the shoe 88A or 88B when the shank 108 is in the disengaged position (FIG. 9).

Figure 8:
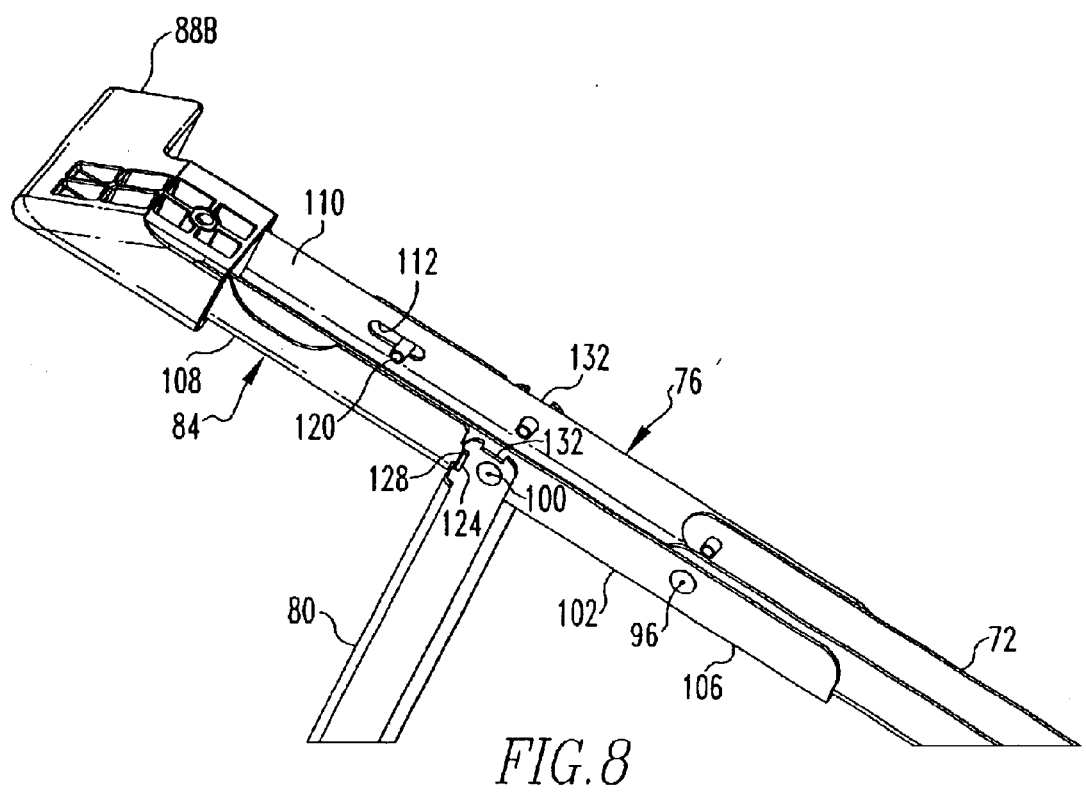
FIG. 8 is a perspective view of a portion of the underside of one of the legs of the wheelbarrow in the extended position and depicting a lock of the leg being in an engaged position.
Figure 8A:
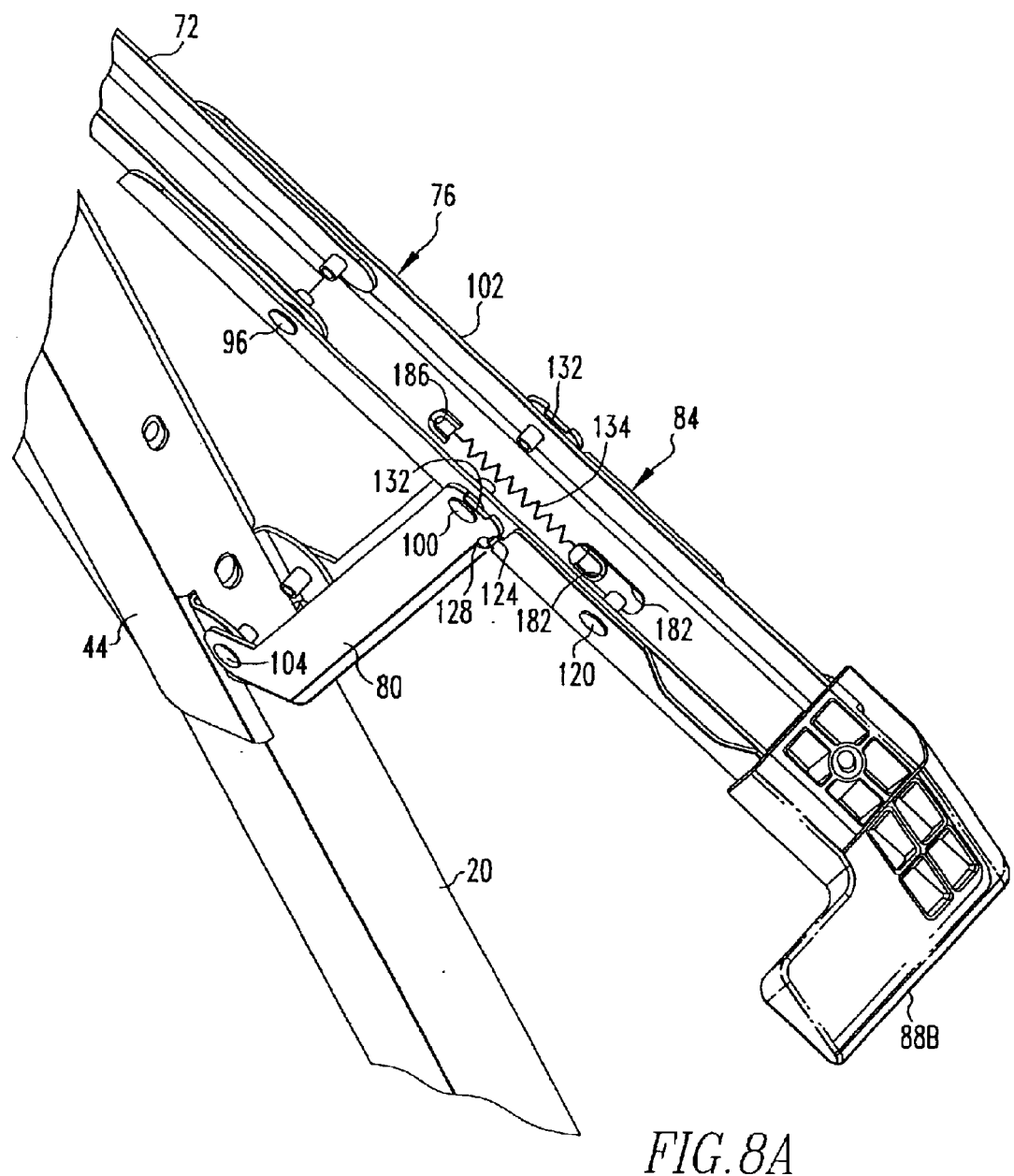
FIG. 8A is another perspective view of a portion of the underside of one of the legs.
Figure 9:
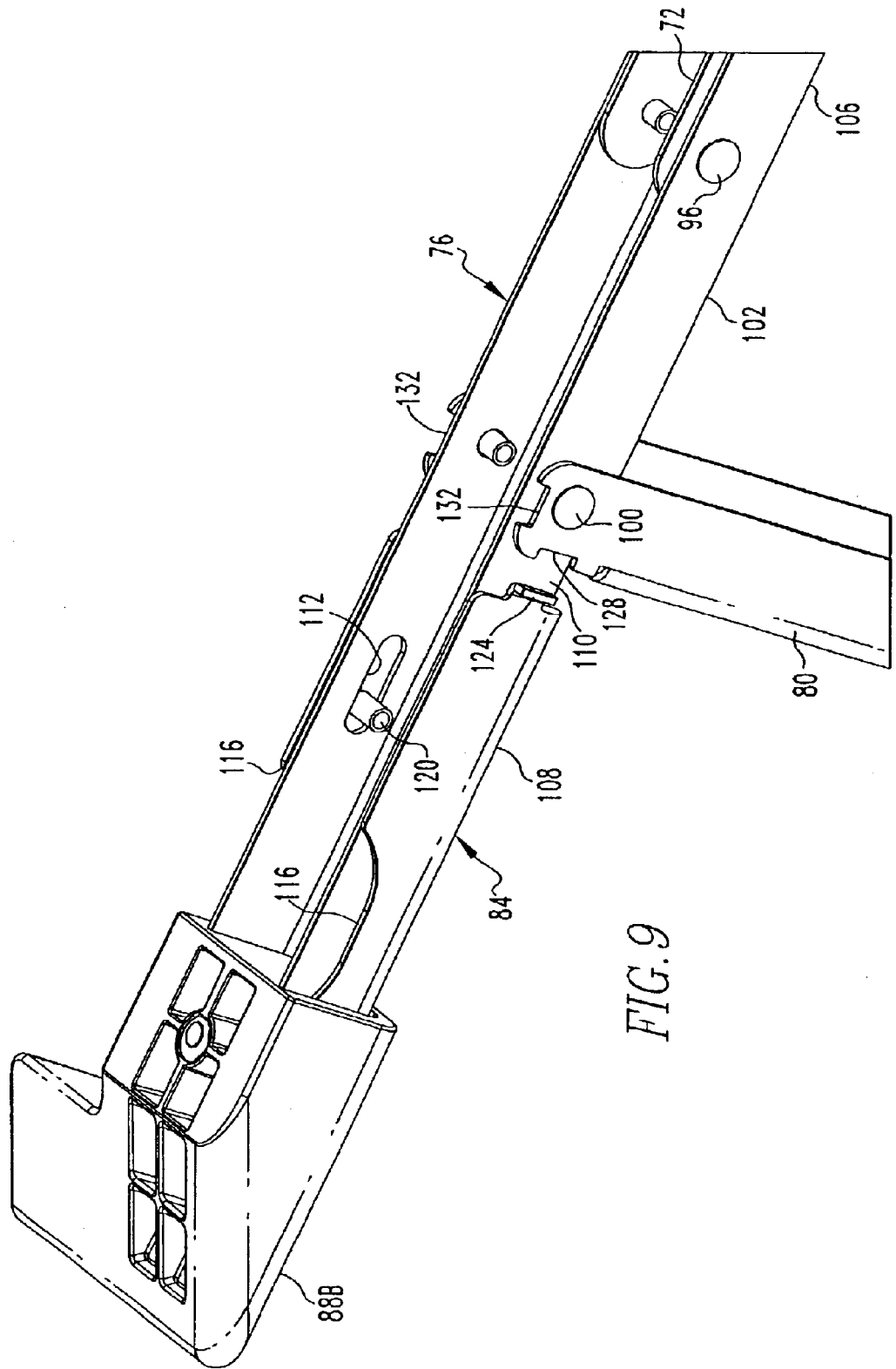
FIG. 9 is a view similar to FIG. 8, except depicting the lock in a disengaged position.
Figure 10:
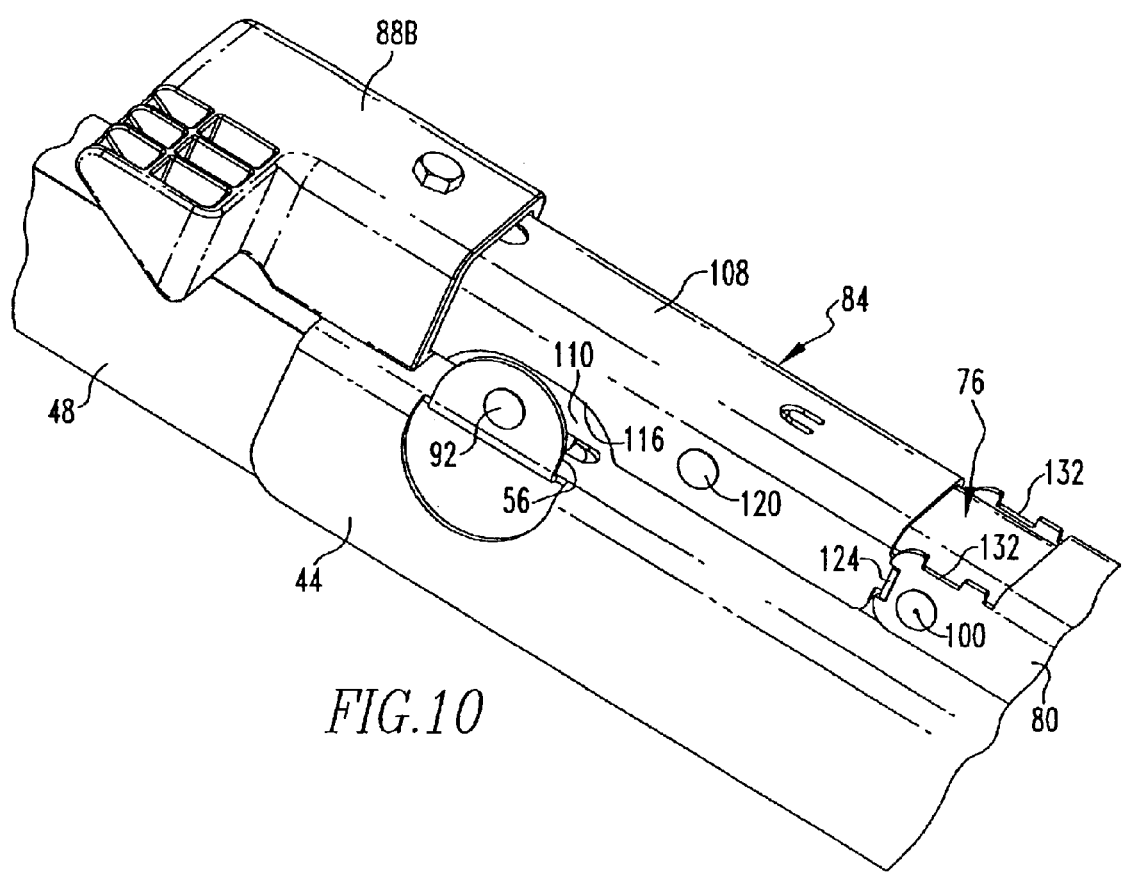
FIG. 10 is a perspective view of the leg in the retracted position and the lock in the engaged position.

The tabs 124 are engaged in the first notches 128 when the shank 108 is in the engaged position and the leg 64 is in the extended position (FIG. 8). The tabs 124 are engaged in the second notches 132 when the shank 108 is in the engaged position and the leg 64 is in the retracted position (FIG. 10). It can be understood that when the tabs 124 are engaged in the first notches 128 (FIG. 8) the leg 64 is locked in the extended position. Similarly, when the tabs 124 are engaged in the second notches 132 (FIG. 10) the leg 64 is locked in the retracted position. The biasing device 134 (FIG. 8A) biases the shank 108 toward the engaged position and is depicted schematically as a helical tension spring extending between a first lip 178 on the lock 84 and a second lip 186 formed on the second member 76, the spring extending through an access way 178 formed in the second member 76, although other biasing structures and methodologies may be employed.

Figure 11:
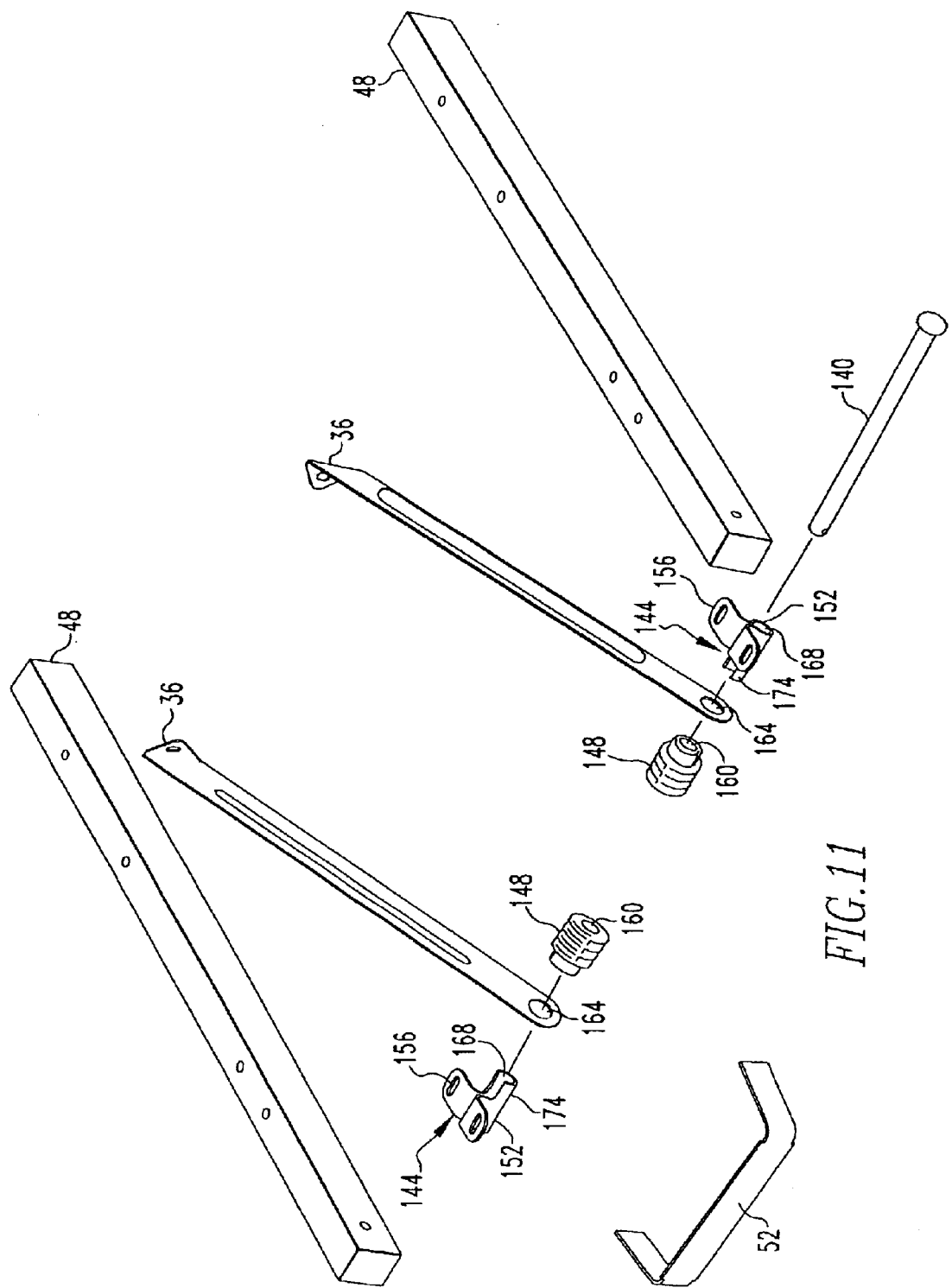
FIG. 11 is an exploded view of a portion of the wheelbarrow.

As can be understood from FIGS. 4 and 11, the axle apparatus 32 includes an axle bracket 136 that is mounted on the frame 24 and an axle 140 that is mounted on the axle bracket 136. The axle bracket 136 includes a pair of end members 144 and a pair of spacers 148, with each end member 144 including a generally cylindrical hub portion 152 and a generally planar flange portion 156 connected with one another. The spacers 148 are substantially cylindrical bodies that are formed with a substantially cylindrical central bore 160 extending therethrough.

It can be seen from FIG. 11 that the tray braces 36 are each formed with a mounting hole 164 at one end thereof. In assembling the axle apparatus 32 and attaching it to the frame 24, a protruding portion 174 of the hub portion 152 of one of the end members 144 is received through the mounting hole 164 of one of the tray braces 36. The protruding portion 174 of the hub portion 152 is then press fit into the central bore 160 of one of the spacers 148 which retains the tray brace 36 interposed substantially between the spacer 148 and the flange portion 156. The other end member 144 and spacer 148 are similarly assembled with the other tray brace 36. The hub portions 152 are then aligned with one another, and the flange portions 156 are mounted to the frontal frame members 48 with appropriate fasteners such as screws or other fasteners. The axle 140 can be received in the openings 168 defined in the hub portions 152.

The wheelbarrow 4 thus described includes a support 28 having a pair of legs 64 that are movable between an extended position and a retracted position and are lockable in both such positions. The legs 64 are each configured to function as four-bar linkages that are collapsible upon themselves to occupy only a minimal region of space when in the retracted position. It is understood that in other embodiments (not shown) of the present invention, the various members of the legs may be of lengths having different proportions to one another and may pivot between the extended and retracted positions in different rotational relationships with respect to one another than the exemplary wheelbarrow 4 depicted in the accompanying figures. It is further understood that it may be desirable in some embodiments (not shown) for one or more of the members of the legs to be detachable from one another.

The wheelbarrow 4 described above is also advantageously configured to be assembled relatively quickly. Specifically, the frame subassembly 8 can be manufactured and delivered to the retailer or the customer in an assembled condition. In order to assemble the wheelbarrow, the axle 140 is removed from the axle bracket 136, and the tray braces 36 are pivoted from their initial position substantially parallel with the frontal frame members 48 to a position substantially perpendicular to the frontal frame members 48.

The wheel 12 is aligned with the axle bracket 136 and the axle is received through the hub portions 152 and the wheel 12. The axle 140 may be retained in place by a cotter pin, C-clip or other structure attached to an end of the axle 140. The handles 20 are mounted to the central frame members 44 by receiving a portion of the handles 20 into the central opening of the central frame members 44 adjacent the portion of the frontal frame members 48 received in the central frame members. The handles 20 can be fastened to the central frame members 44 with appropriate fasteners and/or adhesives of known types.

Figure 12:
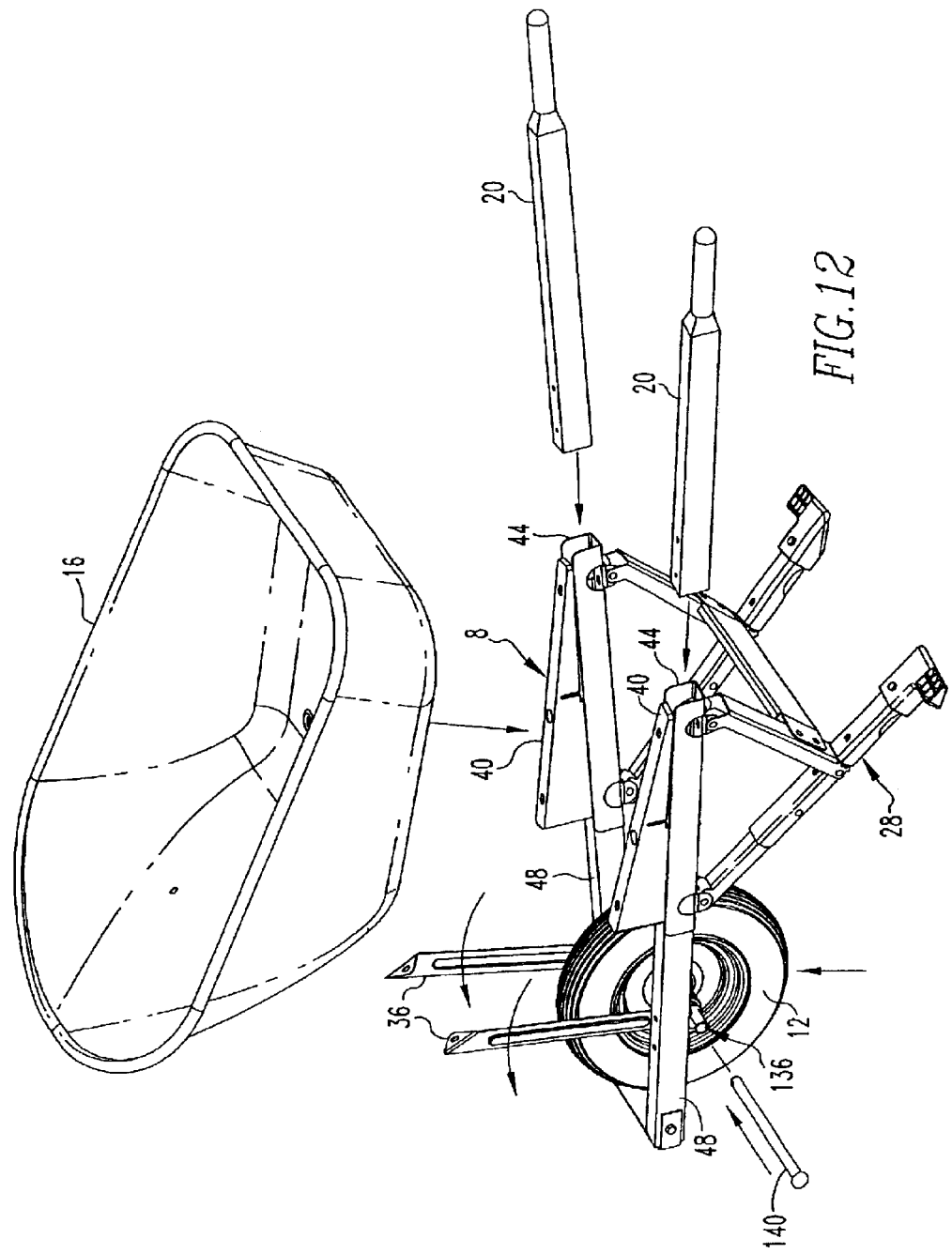
FIG. 12 is an operational view depicting initial assembly of the wheelbarrow.

The tray 16 is then mounted to the frame subassembly 8. The tray 16 is disposed against the risers 40 and is mounted to the central frame members 44 with the use of appropriate fasteners and/or adhesives. Additionally, the tray braces 36 are fastened to the tray 16 with appropriate fasteners. These assembly steps are all indicated generally in FIG. 12.

Essentially, therefore, since the frame subassembly 8 can be delivered in an assembled condition, the wheelbarrow 4 can be assembled by mounting the wheel 12, the tray 16, and the handles 20 to the frame subassembly 8. Such assembly is relatively simple and can be accomplished relatively quickly by unskilled personnel.

Figure 13:
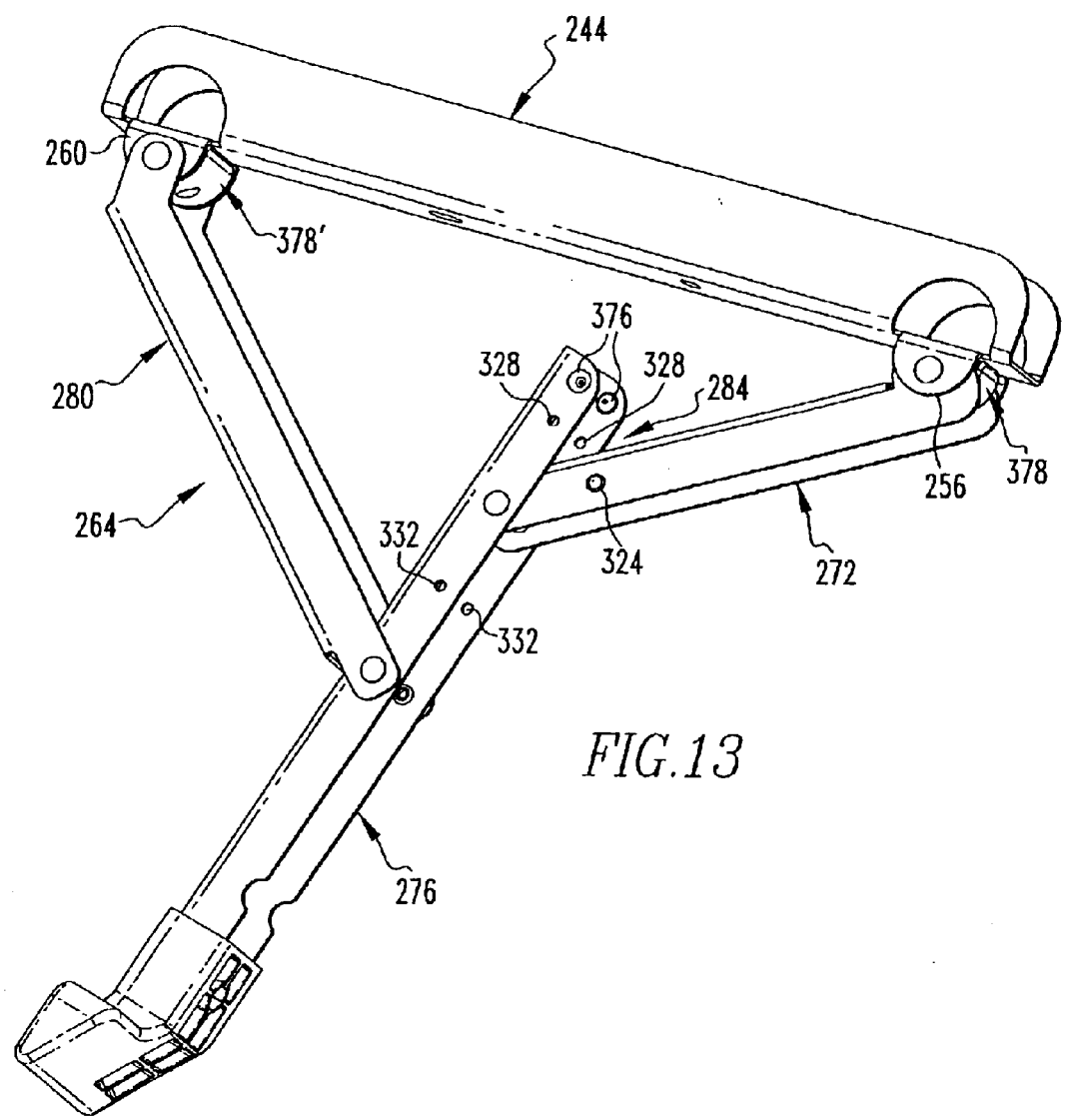
FIG. 13 is a perspective view of an alternate embodiment of a leg in accordance with the present invention in a partially collapsed configuration.
Figure 15:
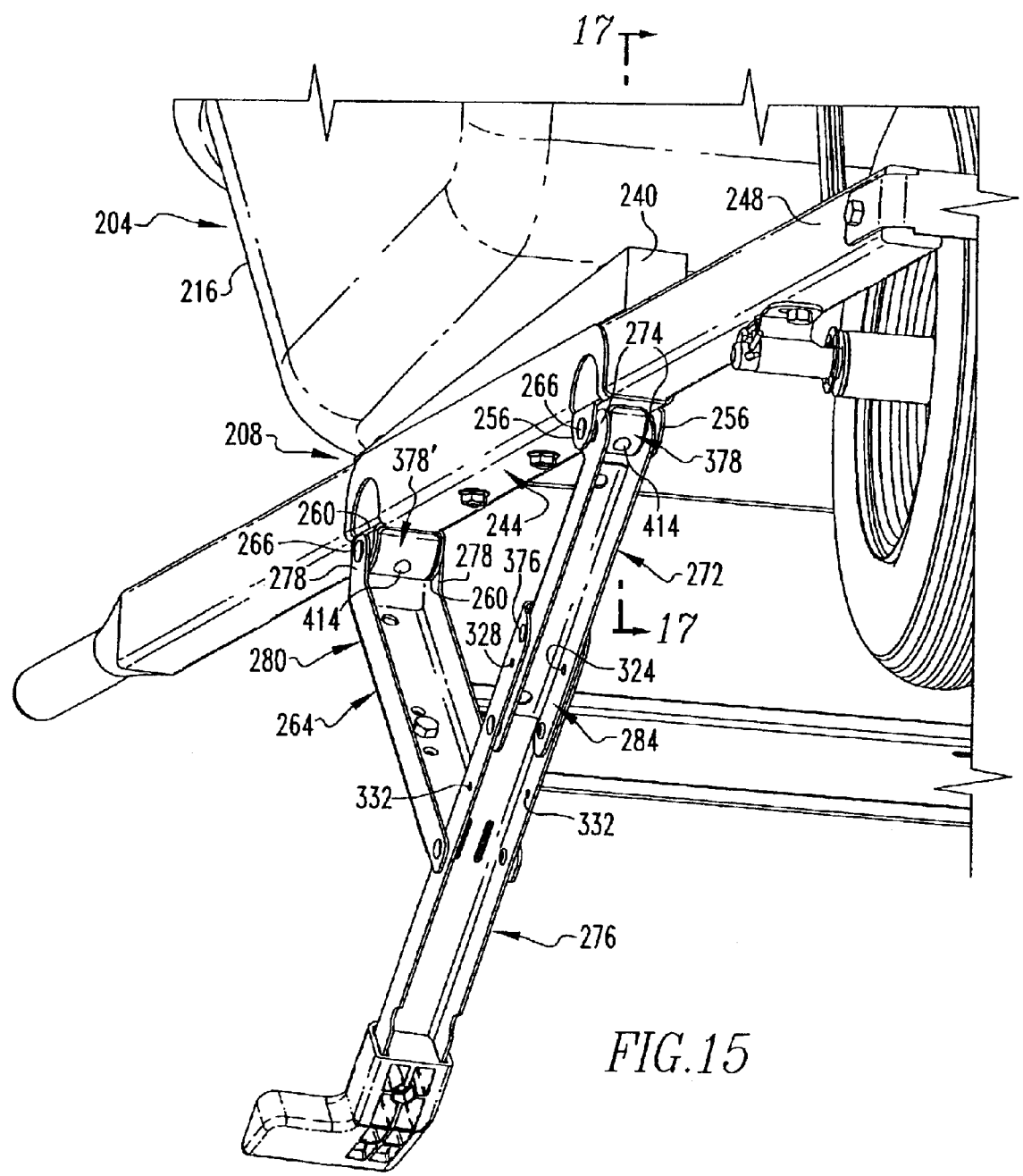
FIG. 15 is a view of an improved wheelbarrow in accordance with the present invention that incorporates the leg in accordance with the alternate embodiment, with the leg being in a non-collapse configuration.

An alternate embodiment of a leg 264 is indicated generally in FIGS. 13 and 15. A pair of the legs 264 can be substituted for the legs 64 to form an improved wheelbarrow 204 (FIG. 15) in accordance with an alternate embodiment of the present invention. As will be set forth in greater detail below, the leg 264 is substantially similar to the leg 64 but has a different locking mechanism.

The leg 264 is movable between an extended position and a retracted position in a fashion similar to the leg 64 depicted in FIGS. 1 and 3A. The leg 264 is depicted in FIG. 13 as being in an intermediate position between the extended and retracted positions in order to describe the various components of the leg 264. It is noted that the leg 264 is depicted in FIG. 13 as being mounted to a central frame member 244 that is identical to the central frame member 44 as described above and depicted in, for instance, FIG. 5. The central frame member includes a pair of forward ears 256 and a pair of rearward ears 260.

The leg 264 includes a first member 272, a second member 276, and a third member 280. The first member 272 is pivotably connected with the forward ears 256, and the third member is pivotably connected with the rearward ears 260. The second member 276 is pivotably connected with and pivotable with respect to each of the first and third members 272 and 280. The second member 276 is engageable with the surface 30 of FIG. 5 in the same fashion as the second member 76 of the leg 64.

Figure 14:
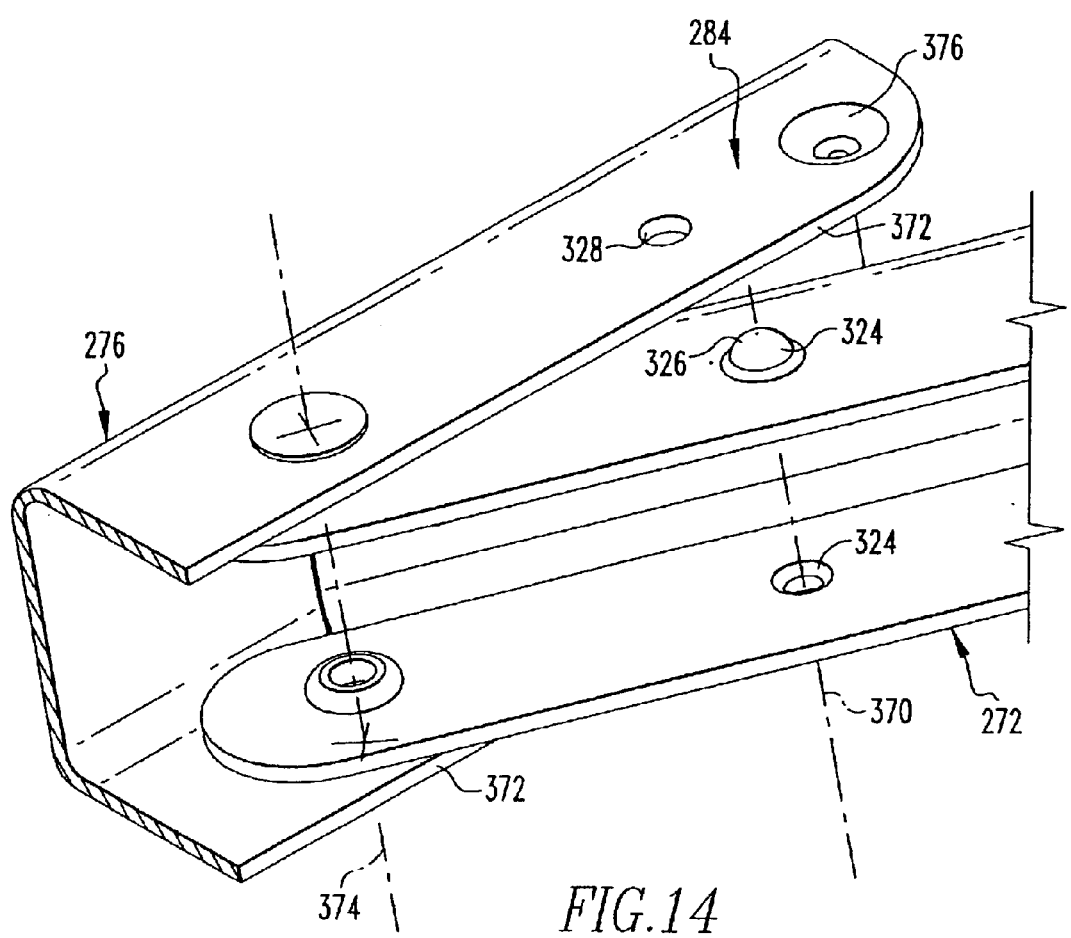
FIG. 14 is an enlarged perspective view of a portion of the leg.

The leg 264 additionally includes a lock 284 that, in the exemplary embodiment depicted in FIGS. 13 and 14, extends between the first member 272 and the second member 276. In other embodiments (not shown) the lock 284 can extend between other structures without departing from the concept of the present invention. The lock 284 releasably retains the leg 264 in both the extended and retracted positions. As will be set forth more fully below, the lock 284 does not require the manual sliding of a structure prior to pivoting of the leg 264 between the extended and retracted positions. The first and second members 272 and 276 are pivotable with respect to one another about a pivot axis 374 (FIGS. 13 and 14.)

As can be best understood from FIG. 13, the lock 284 includes a pair of dogs 324 disposed on the first member 272, a pair of first receptacles 328 disposed on the second member 276, and a pair of second receptacles 332 similarly disposed on the second member 276. The lock 284 can also be said to include a pair of buttresses 376 disposed on the second member 276 that enhance the proper functioning of the lock 284.

As is best shown in FIG. 14, the dogs 324 are generally rounded protrusions or dimples that protrude outwardly in opposite directions from the first member 272. The dogs 324 extend outwardly from the first member 272 in a direction generally parallel with the pivot axis 374, as can be seen from a dog axis 370 of FIG. 14 that extends through the two dogs 324. The dogs 324 can be formed by any of a wide variety of known material forming operations including stamping and/or other methodologies.

The first and second receptacles 328 and 332 are holes formed in the second member 276, and it is noted that the first receptacles 328 and the second receptacles 332 are disposed generally on opposite sides of the pivot axis 374. As can be understood from FIGS. 13 and 15, the dogs 324 are at least partially received in the first receptacles 328 when the leg 264 is in the extended position. Similarly, the dogs 324 are at least partially received in the second receptacles 332 when the leg 264 is in the retracted position. As will be described in greater detail below, when moving the leg 264 between the extended and retracted positions, the dogs 324 and the first and second receptacles 328 and 332 are caused to deflect away from one another to permit the reception and removal of the dogs 324 into and out of the first and second receptacles 328 and 332.

Since the dogs 324 are generally rounded or arcuate, it can be seen that at least a portion of the dog 324 is oriented at an angle that is generally oblique to the dog axis 370. As used herein, the expression "oblique" and variations thereof shall broadly construed to indicate relative orientations that are neither perpendicular to one another nor parallel with one another. In this regard, it can be seen that an imaginary tangent to substantially any portion of the surface of the dog 324, such as except for the apex of the dog 324, lies at an angle that is oblique to the dog axis 370. The dogs 324 thus can be considered to include an arcuate or rounded engagement surface 326, at least a portion of which is oriented generally oblique to the dog axis 370 and thus to the pivot axis 374.

Such obliqueness of the engagement surface 326 with respect to the pivot axis 374 facilitates the deflection of the dogs 324 and the first and second receptacles 328 and 332 away from one another as desired generally without the need to manually disengage the dog 324 from the first and second receptacles 328 and 332. When a force or torque is applied to the leg 264 to move the leg 264 from the extended position toward the retracted position, the engagement surfaces 326 and the first receptacles 328 are engageable with one another, which results in the dogs 324 being deflected in a direction generally away from the first receptacles 328, and/or vice-versa, in a direction generally parallel with the pivot axis 374. Such deflection the dogs 324 and the first receptacles 328 is more particularly deflection of portions of the first and second members 272 and 276 in the vicinity of the dogs 324 and the first receptacles 328 due to the elasticity of the material of the first and second members 272 and 276, which is anticipated to be metal but may be other materials. Such automatic disengagement similarly occurs between the dog 324 and the second receptacle 332 when the leg 264 is initially moved from the retracted position toward the extended position.

Such deflection of the dogs 324 and the first and second receptacles 328 and 332 away from one another also occurs upon engagement of the engagement surfaces 326 with a pair of leading edges 372 of the second member 276. Such deflection the dogs 324 and the first and second receptacles 328 and 332 again is more particularly deflection of portions of the first and second members 272 and 276 due to the elasticity of the material of the first and second members 272 and 276. It is noted that the aforementioned deflections of the dog 324 and the first and second receptacles 328 and 332 away from one another occurs generally in a direction that is generally parallel with the pivot axis 374 and the dog axis 370.

While the exemplary first and second receptacles 328 and 332 are generally cylindrical holes formed in the second member 276, they could be concave or other shaped indentations formed in the second member 276 with which the dog 324 could become engaged. When the leg 264 is in the extended position, the buttresses 376 of the second member 276 are engaged with the first member 272. Such engagement between the buttresses 376 and the first member 272 resists relative motion between the first and second members 272 and 276 which resists the unintended removal of the dogs 324 from the first receptacles 328. In this regard, it is particularly noted that the first receptacles 328 are disposed generally between the buttresses 376 and the pivot axis 374.

In accordance with another aspect of the present invention, a support block 378 (FIG. 16) can be provided for use with either or both of the wheelbarrows 4 or 204. The support block 378 resists deflection of the forward and rearward ears 56, 60, 256, and 260, and additionally provides a structure that is cooperable with a fastener 402 to allow the rapid attachment of the tray 16 to the frame sub assembly 8. While the support block 378 is depicted in FIG. 15 as being a component of the wheelbarrow 204, it is understood that the support block 378 can also be employed in conjunction with the wheelbarrow 4.

Figure 16:
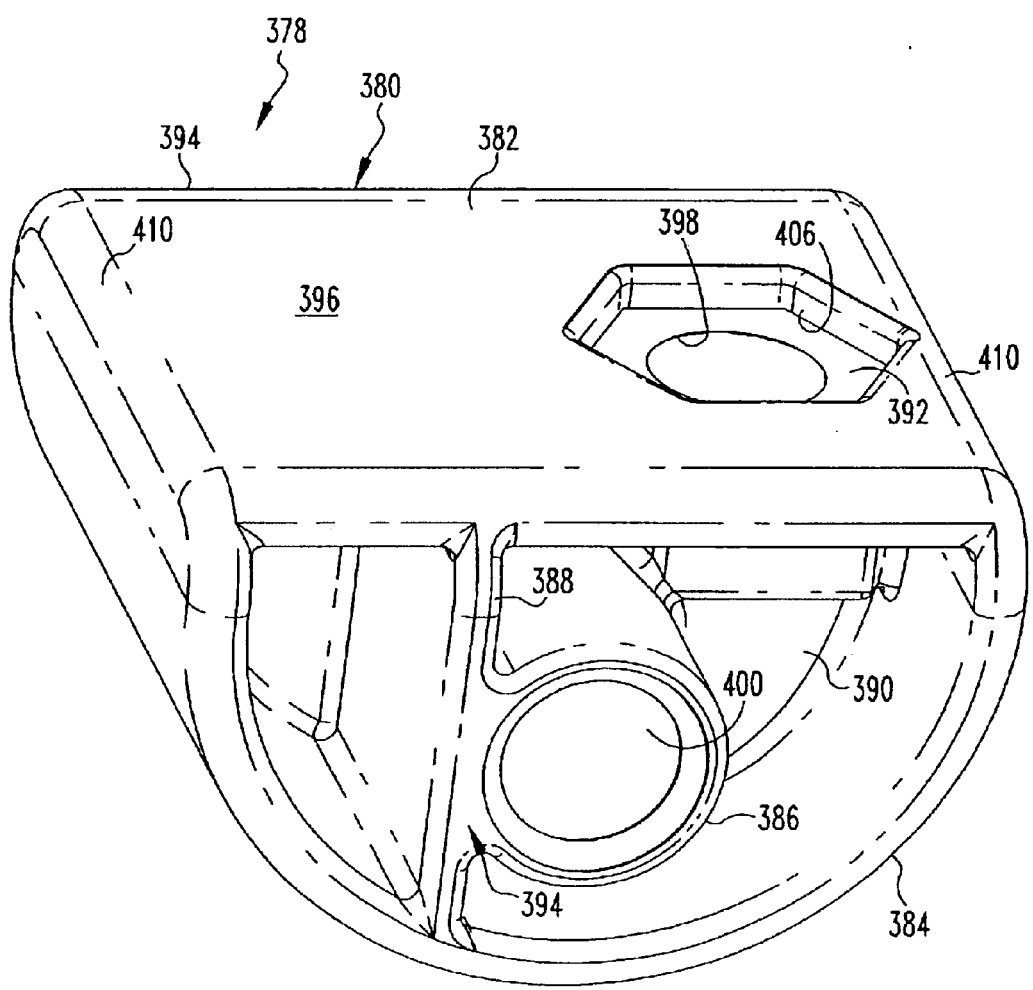
FIG. 16 is a perspective view of a support body in accordance with the present invention that can be employed in the wheelbarrow.

As is best shown in FIG. 16, the support block 378 includes a substantially rigid body 380 that can be formed out of any of a variety of materials including tough plastics and other materials. The body 380 includes a plate portion 382, an arc portion 384, a tube 386, a first rib 388, and a second rib 390. The support block 378 additionally includes a nut 392 disposed on the body 380. In the exemplary embodiment depicted herein, the nut 392 is mounted in a socket 406 formed in the plate portion 382 of the body 380. If, for instance, the nut 392 were formed of a metallic material and the body 380 were formed of a moldable plastic material, the material of the body 380 could be moldable about the nut 392 to thereby form the socket 406. In other embodiments, however, the socket 406 could be formed in the body 380 with the nut 392 then being received into the socket 406, although still other methodologies of connecting the nut 392 and the body 380 together can be employed without departing from the concept of the present invention.

The plate portion 382 is a generally planar and rectangular piece of material, and the arc portion 384 is an arcuate plate of material. The arc of the arc portion 384 terminates at and is connected with the plate portion 382. The tube 386 is a generally tubular member being generally annular in cross section and thus including a cylindrical mounting hole 400 extending therethrough.

The first and second ribs 388 and 390 are both generally planar members that extend between the plate portion 382, the tube 386, and the arc portion 384. The first rib 388 extends along the longitudinal extent of the tube 86, while the second rib 390 extends generally transverse to such longitudinal extent of the tube 386. The body 380 may be molded out of a moldable material such as a plastic, although other formation methodologies and materials may be employed as appropriate.

The plate portion 382 includes a generally planar mounting surface 396 thereon that faces generally away from the arc portion 384. The body 380 also includes a pair of opposed support surfaces 394 that are connected with the mounting surface 396 and that extend across the generally coplanar terminal edges of the arc portion 384, the tube 386, and the first rib 388. It is noted that the connection between the mounting surface 396 and the support surfaces 394 is radiused as is indicated generally at the numeral 410.

Figure 17:
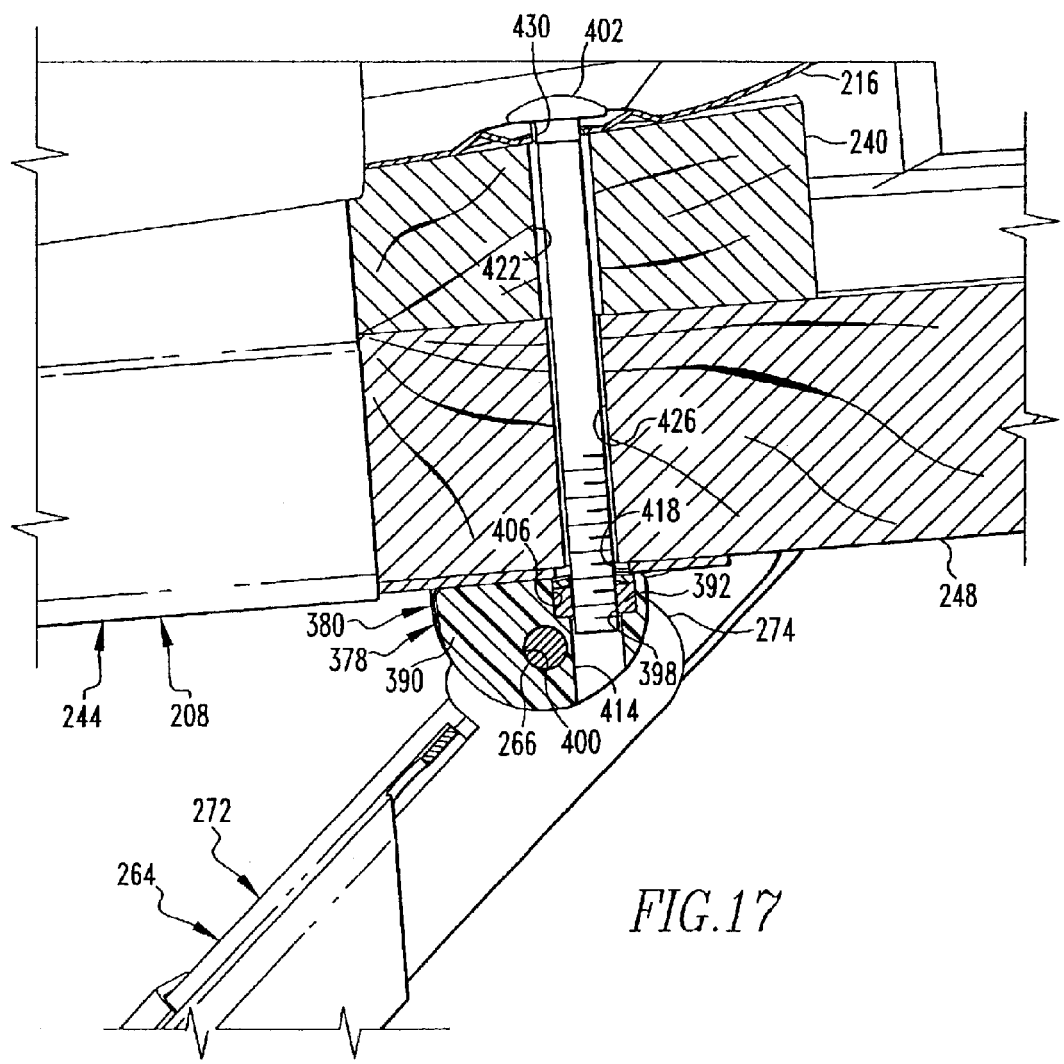
FIG. 17 is a sectional view as taken along line 17—17 of FIG. 15.

The nut 392 includes a fastener hole 398 formed therein that is fastenably cooperable with a fastener 402. The fastener 402 is depicted in FIG. 17 as being a threaded device such as a bolt. In the depicted exemplary embodiment, therefore, the fastener hole 398 would be threaded in a fashion that is threadably cooperable and thus fastenably cooperable with the fastener 402. It is noted, however, that the nut 392 and the fastener 402 can be connected in other non-threadable fashions, such as with the use of bayonet fittings, interference fittings, and numerous other fastening methodologies. It is also noted that the fastener hole 398 may be formed directly on the body 380, such as when the material out of which the support block 378 is formed would possess sufficient mechanical properties to be fastenably cooperable with the fastener 402, which would likely obviate the need for the nut 392. The body 380 additionally includes a clearance hole 414 (FIG. 17) formed therein that is substantially axially aligned with the fastener hole 398.

It is noted that the mounting hole 400 is oriented generally perpendicular with and is offset from the fastening hole 398 and thus the clearance hole 414, as can be seen in FIG. 17. In this regard, the expression "offset" means that the central axes of the mounting hole 400 and the fastener hole 398 do not intersect, and rather are spaced apart from one another.

As can be seen in FIG. 15, the first member 272 includes a pair of first lugs 274 disposed at one end thereof, with the first lugs 274 being disposed between the forward ears 256. The support body 378 is disposed between the first lugs 274, with the support surfaces 394 being disposed adjacent and engaged with the first lugs 274. It can be understood from FIGS. 15 and 17 that the central frame member 244 additionally includes a pivot shaft 266 extending through holes formed in the forward ears 256 and the first lugs 274, and also extends through the mounting hole 400 to mount the support block 378 to the first member 272 and to the forward ears 256. By interposing the support block 378 between the first lugs 274, the support block 378 resists deformation of the first lugs 274 during loading of the leg 264, which strengthens the wheelbarrow 204 and resists bending or breakage thereof during use. The support block 378 resists deformation of the first lugs 274 by resisting movement of any portion of either of the first lugs 274 toward one another, which otherwise would likely be the failure mode of that portion of the wheelbarrow 204 during loading of the leg 264. Also, the first lugs 274 generally cannot be deformed away from one another since the first lugs 274 are interposed between the forward ears 256, it being noted that the space between the forward ears 256 and the first lugs 274 in FIG. 15 is exaggerated for purposes of clarity. While the pivot shaft 266 is indicated in FIG. 15 as being a threaded bolt/nut combination, the pivot shafts 266 can be of numerous non-threaded configurations, such as with the use of a cylindrical peg with one or more cotter pins or other such arrangements.

FIG. 15 additionally depicts a support block 378' which is substantially identical to the support block 378 except that the support block 378' is relatively longer, whereby the support surfaces 394 thereof are spaced slightly farther apart than the support surfaces 394 of the support block 378. The slightly longer support block 378' is provided in order to be disposed between the rearward ears 260 of the central frame member 244. It is noted that the third member 280 includes a pair of third lugs 278 disposed at one end thereof, and the rearward ears 260 are disposed between the third lugs 278. The rearward ears 260 are disposed between the third lugs 278 instead of the reverse in order to permit the leg 264 to collapse with the first, second, and third members 272, 276, and 280 being received within one another, as is indicated generally in FIG. 6 in the context of the wheelbarrow 4.

The support block 378' is interposed between and engaged with the rearward ears 260 and thus resists deformation of the rearward ears 260. In the absence of the support block 378, the likely failure mode of the rearward ears 260 during loading of the leg 264 would be to deform toward one another, it being noted that the rearward ears 260 likely would not deform away from one another since they are interposed between the third lugs 278.

Accordingly, the support blocks 378, which would include the slightly longer version depicted at the numeral 378', resist deformation of the various components of the legs 264 and/or the central frame member 244, which enhances the overall strength of the wheelbarrow 204, as well as the wheelbarrow 4 if incorporated therein. The support block 378 could also be employed in other structures to resist deformation thereof, as appropriate.

As can be understood from FIG. 17, the configuration of the support block 378 additionally facilitates the rapid assembly of the wheelbarrow 204 by allowing a tray 216 of the wheelbarrow 204 to be rapidly attached to structures such as the central frame member 244. In assembling the wheelbarrow 204 one must attach the tray 216 to a frame subassembly 208 of the wheelbarrow 204. In this regard, it is noted that the support blocks 378 would already be mounted to the frame subassembly 208 when received from the manufacturer of the wheelbarrow 4 or 204.

When the mounting surface 396 is disposed against the central frame member 244, the fastener hole 398 is aligned with an opening 418 in the central frame member 244, an opening 422 in a riser 240, and an opening 426 in a frontal frame member 248 of the frame subassembly 208. To attach the tray 216 to the frame subassembly 208, one needs only to receive the fastener 402 in an opening 430 formed in the tray 216 and to receive the fastener 402 through the openings 422, 426, and 418 to permit the fastener 402 to fastenably engage the nut 392. In this regard, it can be seen that the fastener 402 need only be inserted blindly into the openings 422, 426, and 418 to permit fastenable engagement of the fastener 40 with the nut 392. Since the nut 392 is disposed on the support block 378, which is disposed on the frame subassembly 208, it is not necessary for a person assembling the wheelbarrow 204 to manually hold the nut 392 in a position underneath the wheelbarrow 204 where it can be fastenably connected with the fastener 402. The engagement of the mounting surface 396 with the central frame member 244 resists pivoting of the support block 378 about the pivot shaft 266 during fastenable engagement of the fastener 402 with the nut 392. The pivot shaft 266 also retains the alignment of the fastener hole 398 with the openings 422, 426, and 418. The support block 378 thus advantageously permits the tray 216 to be fastened to the frame subassembly 208 without the need to manually hold nuts 392 or other structures that are fastenably cooperable with the fasteners 402, which saves time and effort.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A wheelbarrow that can be disposed on a surface, the wheelbarrow comprising:

a frame;

at least a first wheel mounted on the frame; and a support;

the support including at least a first leg mounted on the frame;

the at least first leg being movable between an extended position and a retracted position;

the at least first leg including a first member, a second member, and a third member;

the first and third members each being pivotably mounted on the frame;

the second member being pivotably connected with each of the first and third members;

a lock releasably retaining the at least first leg in at least one of the extended position and the retracted position;

at least one of the first member, the second member, and the third member being pivotable about a pivot axis with respect to another of the first member, the second member, the third member, and the frame;

the lock including a dog and at least a first receptacle;

the dog being receivable in the at least first receptacle to releasably retain the at least first leg in the at least one of the extended and retracted positions; and at least one of the dog and the at least first receptacle being deflectable in a direction generally parallel with the pivot axis.

2. The wheelbarrow as set forth in claim 1, in which the second member is engageable with the surface when the at least first leg is in the extended position.

3. The wheelbarrow as set forth in claim 2, in which the lock extends between the second member and one of the first and third members, the dog being disposed on one of the second member and the one of the first and third members, the at least first receptacle being disposed on the other of the second member and the one of the first and third members.

4. The wheelbarrow as set forth in claim 1, in which the first, second, and third members are oriented substantially parallel with at least a portion of the frame when the at least first leg is in the retracted position.

5. The wheelbarrow as set forth in claim 1, in which the first, second, and third members are disposed generally flush with the frame when the at least first leg is in the retracted position.

6. The wheelbarrow as set forth in claim 1, in which the lock includes a second receptacle;

the dog being receivable in the second receptacle to releasably retain the at least first leg in the other of the extended and retracted positions.

7. The wheelbarrow as set forth in claim 6, in which the pivot axis is disposed generally between the at least first and second receptacles.

8. The wheelbarrow as set forth in claim 3, in which the dog is a dimple protruding outwardly from the one of the second member and the one of the first and third members.

9. The wheelbarrow as set forth in claim 8, in which the dog protrudes outwardly from the one of the second member and the one of the first and third members in a direction generally parallel with the pivot axis.

10. The wheelbarrow as set forth in claim 3, in which one of the second member and the one of the first and third members includes a buttress;

the buttress being engaged with the other of the second member and the one of the first and third members when the at least first leg is in the one of the extended and retracted positions;

the buttress resisting relative motion between the second member and the one of the first and third members to resist unintentional disengagement of the dog from the at least first receptacle.

11. The wheelbarrow as set forth in claim 10, in which the dog is disposed generally between the pivot axis and the buttress when at least first leg is in the one of the extended and retracted positions.

12. The wheelbarrow as set forth in claim 8, in which at least one of the dog and the at least first receptacle includes an engagement surface, at least a portion of the engagement surface being oriented generally oblique to the pivot axis, the other of the at least one of the dog and the at least first receptacle being engageable with the at least portion of the engagement surface to remove the dog from the at least first receptacle when moving the at least first leg from the at least one of the extended and retracted positions toward the other of the at least one of the extended and retracted positions.

13. The wheelbarrow as set forth in claim 12, in which the at least portion of the engagement surface is arcuate.

14. The wheelbarrow as set forth in claim 8, in which the dog is a generally rounded;

the dog being structured and arranged to be removable from the at least first receptacle upon moving the at least first leg toward the other of the at least one of the extended and retracted positions with sufficient force to deflect at least one of the dog and the at least first receptacle away from the other of the dog and the at least first receptacle.

15. The wheelbarrow as set forth in claim 1, in which the at least first leg cooperates with the frame to function as a four-bar linkage.

16. The wheelbarrow as set forth in claim 1, in which the frame includes a pair of ears oriented generally parallel with one another; one of the first and third members being mounted on the ears;

the frame including a support block disposed between the ears, the support block being structured and arranged to resist deflection of at least one of the at least first leg and the pair of ears.

17. The wheelbarrow as set forth in claim 16, in which the support block is disposed against each of the ears.

18. The wheelbarrow as set forth in claim 16, in which the one of the first and third members including a pair of lugs; the lugs being disposed between the ears; the support block being disposed between the lugs.

19. The wheelbarrow as set forth in claim 16, in which the frame includes at least a first frame member; the ears extending from the at least first frame member; the support block including a mounting surface; the mounting surface being engageable with the at least first frame member.

20. The wheelbarrow as set forth in claim 19, in which the support block includes a fastener hole formed therein, the fastener hole being structured and arranged to cooperate with a fastener extending through the at least first frame member.

21. A kit from which a wheelbarrow can be assembled, the kit comprising: a frame subassembly;

the frame subassembly including a frame, an axle apparatus, at least a first leg, and at least a first tray brace connected together as an assembled unit, the at least first tray brace being pivotable with respect to the frame, and wherein said frame includes a pair of ears oriented generally parallel with one another, the at least first leg being mounted to the ears;

a wheel mountable to the frame subassembly;

a tray mountable to the frame subassembly;

at least a first handle mountable to the frame subassembly;

a support block disposed on the frame, the support block including a fastener hole formed therein;

the support block disposed between the ears, the support block being structured and arranged to resist deflection of the ears; and a fastener;

the fastener being fastenably cooperable with the fastener hole of the support block to mount the tray to the frame subassembly.

22. The kit as set forth in claim 21, in which the support block is mounted to the ears and is disposed against each of the ears.

* * * * *